United States Patent
Liu et al.

(10) Patent No.: US 11,330,477 B2
(45) Date of Patent: May 10, 2022

(54) APPARATUS AND METHODS FOR SWITCHING BETWEEN TWO BANDWITH PARTS

(71) Applicant: Huawei Technologies Co., Ltd., Shenzhen (CN)

(72) Inventors: Zhe Liu, Shanghai (CN); Hao Tang, Shanghai (CN); Fan Wang, Berkshire (GB); Zhenfei Tang, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/673,161

(22) Filed: Nov. 4, 2019

(65) Prior Publication Data

US 2020/0068443 A1 Feb. 27, 2020

Related U.S. Application Data

(63) Continuation of application No. PCT/CN2018/085498, filed on May 3, 2018.

(30) Foreign Application Priority Data

May 5, 2017 (CN) .......................... 201710313916.6

(51) Int. Cl.
*H04W 28/20* (2009.01)
*H04L 5/00* (2006.01)
(Continued)

(52) U.S. Cl.
CPC ............. *H04W 28/20* (2013.01); *H04L 5/001* (2013.01); *H04L 5/0053* (2013.01);
(Continued)

(58) Field of Classification Search
CPC ..... H04W 28/20; H04W 76/27; H04W 8/245; H04W 72/042; H04W 72/0453;
(Continued)

(56) References Cited

U.S. PATENT DOCUMENTS 7,593,326 B2    9/2009 Collet et al.
2014/0036859 A1 2/2014 Ekpenyong et al.
(Continued)

FOREIGN PATENT DOCUMENTS

CN    104509161 A    4/2015
CN    105099634 A    11/2015
(Continued)

OTHER PUBLICATIONS

Huawei, et al., "Resource allocation and indication for data channel", 3GPP TSG RAN WG1 Meeting #88bis, R1-1705069, Apr. 3-7, 2017, 8 Pages, Spokane, USA.
(Continued)

*Primary Examiner* — Omar J Ghowrwal
(74) *Attorney, Agent, or Firm* — Slater Matsil, LLP

(57) ABSTRACT

A method for adjusting a terminal operating bandwidth, includes: a base station sends configuration information of at least two BPs to a terminal; and the base station sends a BP adjustment instruction to the terminal, where the BP adjustment instruction carries an identifier of a second BP, the second BP is one of the at least two BPs, the BP adjustment instruction is used to instruct the terminal to switch from a first BP to the second BP at a specified timeslot after the terminal receives the BP adjustment instruction.

25 Claims, 8 Drawing Sheets

(51) Int. Cl.
  *H04W 8/24* (2009.01)
  *H04W 72/04* (2009.01)
  *H04W 76/27* (2018.01)
  *H04W 72/12* (2009.01)

(52) U.S. Cl.
  CPC .......... *H04L 5/0094* (2013.01); *H04L 5/0098* (2013.01); *H04W 8/245* (2013.01); *H04W 72/04* (2013.01); *H04W 72/042* (2013.01); *H04W 72/0453* (2013.01); *H04W 72/12* (2013.01); *H04W 72/1289* (2013.01); *H04W 76/27* (2018.02)

(58) Field of Classification Search
  CPC . H04W 72/04; H04W 72/12; H04W 72/1289; H04L 5/0098; H04L 5/001; H04L 5/0094; H04L 5/0053
  See application file for complete search history.

(56) References Cited

U.S. PATENT DOCUMENTS

| | | | | |
|---|---|---|---|---|
| 2017/0257238 | A1* | 9/2017 | Qian | .................. H04L 27/2628 |
| 2018/0083817 | A1* | 3/2018 | Salem | .................. H04L 5/1469 |
| 2018/0146439 | A1* | 5/2018 | Kim | .................... H04W 52/322 |
| 2018/0234896 | A1 | 8/2018 | Liu et al. | |
| 2018/0337752 | A1* | 11/2018 | Choi | ........................ H04B 7/26 |
| 2019/0014561 | A1* | 1/2019 | Takeda | .................... H04J 11/00 |
| 2019/0098626 | A1* | 3/2019 | Yi | .................... H04W 72/0473 |
| 2019/0288828 | A1* | 9/2019 | Ibrahim | ................ H04L 5/0082 |
| 2020/0059345 | A1* | 2/2020 | Pelletier | ................ H04L 1/1657 |
| 2021/0144560 | A1* | 5/2021 | Sesia | ................ H04W 72/0453 |

FOREIGN PATENT DOCUMENTS

| | | |
|---|---|---|
| CN | 106572506 A | 4/2017 |
| JP | 2010178129 A | 8/2010 |
| WO | 2016111582 A1 | 7/2016 |
| WO | 2017016360 A1 | 2/2017 |

OTHER PUBLICATIONS

Mediatek, et al., "Way Forward on bandwidth part in NR", 3GPP TSG-RAN WG1 #88bis, R1-1706666, Agenda Item 8.1.3.3.1, Apr. 3-7, 2017, 3 Pages, Spokane, USA.

Panasonic, "Configuration of DL control resource set and UE bandwidth", 3GPP TSG-RAN WG1 NR AdHoc, Jan. 16-20, 2017, Spokane, USA, R1-1700639, 5 pages.

* cited by examiner

APPARATUS AND METHODS FOR SWITCHING BETWEEN TWO BANDWITH PARTS

CROSS-REFERENCE TO RELATED APPLICATIONS

This application is a continuation of International Application No. PCT/CN2018/085498, filed on May 3, 2018, which claims priority to Chinese Patent Application No. 201710313916.6, filed on May 5, 2017. The disclosures of the aforementioned applications are hereby incorporated by reference in their entireties.

TECHNICAL FIELD

This application relates to the field of wireless communications technologies, and in particular, to a method for adjusting a terminal operating bandwidth, and an apparatus.

BACKGROUND

A given terminal has a fixed bandwidth capability. In other words, each terminal corresponds to a maximum supportable bandwidth. In a Long Term Evolution (LTE) system, a carrier bandwidth is equal to a maximum supportable bandwidth of a terminal. The terminal always needs to activate the maximum supportable bandwidth of the terminal, and detect an entire carrier bandwidth. In addition, the carrier bandwidth cannot be adjusted. However, when the terminal needs to transmit only a small amount of data, a majority part of the maximum supportable bandwidth of and activated by the terminal may not be used. Consequently, the terminal consumes more power, bandwidth resources are improperly used, and it is difficult to achieve energy saving.

In a new radio (NR) design, a carrier bandwidth and a maximum supportable bandwidth of a terminal are decoupled. To be specific, the carrier bandwidth (for example, 100 M) may be greater than the maximum supportable bandwidth (for example, 40 M) of the terminal. Therefore, a base station may allocate a bandwidth, namely, a bandwidth part (BP), less than or equal to the maximum supportable bandwidth of the terminal to the terminal. The terminal transmits control signaling and service data within the BP allocated by the base station.

For example, the carrier bandwidth is 100 M, and three BPs are configured: a BP whose subcarrier spacing (SCS) is 20 M 15 kHz, a BP whose SCS is 40 M 30 kHz, and a BP whose SCS is 40 M 60 kHz. It is assumed that UE supports a first radio frequency bandwidth of a minimum of 20 M, and a second radio frequency bandwidth of a maximum of 40 M. When the terminal uses the BP whose SCS is 20 M 15 kHz to transmit data, the terminal does not need to activate the second radio frequency bandwidth, but needs to activate only the first radio frequency bandwidth, because activation of a bandwidth of 20 M that does not need to be used wastes terminal power. When the UE needs to use a BP whose SCS is 30 kHz to transmit a small amount of data, because only one BP whose SCS is 40 M 30 kHz is configured in the carrier bandwidth, a user needs to activate the second radio frequency bandwidth. However, a BP whose SCS is 10 M 30 kHz may be sufficient. In this case, scheduling signaling overheads on a network side are relatively high. In addition, the terminal is caused to consume more power because if the BP whose SCS is 10 M 30 kHz can be configured for the user, the user needs to activate only the first radio frequency bandwidth.

SUMMARY

Embodiments of this application provide a method for adjusting a terminal operating bandwidth, and an apparatus, to resolve a problem of an inflexible configuration of an existing BP.

According to a first aspect, an embodiment of this application provides a method for adjusting a terminal operating bandwidth, including: sending, by a base station, configuration information of at least two bandwidth parts BPs to a terminal; and sending, by the base station, a BP adjustment instruction to the terminal, where the BP adjustment instruction carries an identifier of a second BP, the second BP is one of the at least two BPs, the BP adjustment instruction is used to instruct the terminal to switch from a first BP to the second BP in a specified timeslot after the BP adjustment instruction is received, and the first BP is one of the at least two BPs. Therefore, the method provided in this application ensures flexible BP configuration, reduces network side overheads, and reduces terminal power consumption.

The first BP is one of the at least two BPs. For example, the first BP may be a currently working BP, and the second BP is a target BP. The at least two BPs herein may be candidate BPs. The second BP may be determined from the candidate BPs.

It should be understood that the BP configuration information herein may be first configuration information, and the BP adjustment instruction herein may further be second configuration information. A difference lies in that the second configuration information carries only the identifier of the second BP.

Moreover, in a possible implementation, alternatively, the BP adjustment instruction may not carry the identifier of the second BP, but is used to instruct the terminal to select one of a plurality of switch patterns preconfigured by using higher layer signaling, that is, carries an identifier of a BP switch pattern. The base station sends information about a plurality of BP switch patterns to the terminal by using higher layer signaling, for example, RRC signaling. The BP switch pattern herein is used to instruct UE to switch according to a configured preset rule. For example, the base station sends information about the plurality of switch patterns, including a pattern 1 and a pattern 2 to the terminal by using the higher layer signaling, for example, the RRC signaling. Further, the BP adjustment instruction may carry an identifier of any one of the foregoing switch patterns, to instruct the terminal whether to use the pattern 1 or the pattern 2 to perform BP switch.

Moreover, in a possible implementation, the second configuration information may carry the BP switch pattern by using the higher layer signaling, for example, the RRC signaling.

In a possible design, the sending, by a base station, configuration information of at least two BPs to a terminal includes: adding, by the base station, a first parameter set of the at least two BPs configured based on the terminal to Radio Resource Control (RRC) signaling, and sending the RRC signaling to the terminal, where a first parameter set of each BP configured based on the terminal includes at least one of: a frequency domain width and a position indication parameter of the BP, a frequency domain width and a position indication parameter of a control resource set CORESET corresponding to the BP, and a subcarrier spacing. Therefore, the base station may configure a different UBP for each terminal by using the RRC signaling, to meet a service requirement of each terminal. Therefore, flexibility of the BP configuration is high.

In a possible design, the sending, by a base station, configuration information of at least two bandwidth parts BPs to a terminal includes: broadcasting, by the base station, a first parameter set of the at least two BPs by using system information block SIB information, where a first parameter set of each BP includes at least one of: a frequency domain width and a position indication parameter of the BP, a frequency domain width and a position indication parameter of a CORESET corresponding to the BP, and a subcarrier spacing. The base station broadcasts the first parameter set of the at least two BPs by using the SIB information. As can be learned from this, the at least two BPs are not configured for a particular terminal, but are configured for all terminals in a cell. In this case, to reduce scheduling signaling overheads on a network side, and reduce terminal power consumption, some BPs with relatively small bandwidths may be configured, so that a terminal having an energy saving requirement can work in these BPs with relatively small bandwidths.

In a possible design, the sending, by a base station, configuration information of at least two bandwidth parts BPs to a terminal includes: adding, by the base station, a second parameter set of at least two BPs configured based on the terminal to Radio Resource Control (RRC) signaling, and sending the RRC signaling to the terminal, where a second parameter set of each BP configured based on the terminal includes at least one of: a frequency domain width and a position indication parameter of the BP, and a frequency domain width and a position indication parameter of a CORESET corresponding to the BP; and broadcasting, by the base station, subband configuration information by using SIB information, where the subband configuration information includes at least one of: a frequency domain width and a position indication parameter of each subband, and a subcarrier spacing corresponding to each subband, and the subband configuration information is used to indicate a subcarrier spacing corresponding to the second parameter set of each BP configured based on the terminal. A difference between the second parameter set of the at least two BPs configured based on the terminal and the first parameter set of the at least two BPs configured based on the terminal lies in that the second parameter set of the at least two BPs configured based on the terminal does not include the subcarrier spacing. The subcarrier spacing corresponding to the second parameter set of the BP configured based on the terminal may be implicitly indicated by using the subband configuration information broadcast by using the SIB information. Therefore, the RRC signaling may not indicate a subcarrier spacing of each BP, but the subband configuration information implicitly indicates the subcarrier spacing of each BP, thereby reducing overheads of the RRC signaling, and ensuring flexibility of the BP configuration.

In a possible design, the sending, by a base station, configuration information of at least two bandwidth parts BPs to a terminal includes: broadcasting, by the base station, a second parameter set of at least two BPs and subband configuration information by using SIB information. A second parameter set of each BP includes at least one of: a frequency domain width and a position indication parameter of the BP, and a frequency domain width and a position indication parameter of a CORESET corresponding to the BP. The subband configuration information includes at least one of: a frequency domain width and a position indication parameter of each subband, and a subcarrier spacing corresponding to each subband. The subband configuration information is used to indicate a subcarrier spacing corresponding to the second parameter set of each BP. Therefore, the subcarrier spacing is also implicitly indicated, but the second parameter set and the subband configuration information of the at least two BPs are both broadcast by using SIB information, and the at least two BPs are not configured for a particular terminal, but are configured for all terminals in a cell.

In a possible design, the specified timeslot is determined based on a timeslot occupied by the BP adjustment instruction sent by the base station, and a time sequence of a subcarrier spacing of a BP whose subcarrier spacing is smaller in a time sequence of a subcarrier spacing of a currently working BP and a time sequence of a subcarrier spacing of a target BP. In a process of switching from the first BP to the second BP, the BP whose subcarrier spacing is smaller needs to be used as a reference. Otherwise, for a UBP timeslot, a cross-subframe border problem, or a cross-timeslot border problem, or a cross-symbol border problem may be caused, and a timing disorder may be further caused.

The base station adds the BP adjustment instruction to DCI or a MAC CE, and sends the DCI or the MAC CE to the terminal.

According to a second aspect, an embodiment of this application provides a method for adjusting a terminal operating bandwidth, including: sending, by a base station, configuration information of at least two bandwidth part BP units to a terminal; and sending, by the base station, a BP unit adjustment instruction to the terminal. The BP unit adjustment instruction carries an identifier of a second BP unit set. The second BP unit set includes at least one of at least two BP units. The BP unit adjustment instruction is used to instruct the terminal to switch from a first BP unit set to the second BP unit set in a specified timeslot after the BP unit adjustment instruction is received. The first BP unit set includes at least one BP unit including a CORESET. The second BP unit set includes at least one BP unit including a CORESET. The first BP unit set is a currently working BP unit set. The second BP unit set is a target BP unit set. Therefore, the method provided in this application ensures flexible BP configuration, reduces network side overheads, and reduces terminal power consumption. It should be understood that the BP configuration information herein may be first configuration information, and the BP unit adjustment instruction herein may further be second configuration information. A difference lies in that the second configuration information carries only an identifier of the second BP unit set.

It should be understood that the BP unit configuration information herein may be first BP unit configuration information, and the BP unit adjustment instruction herein may further be second BP unit configuration information. A difference lies in that the second BP unit configuration information carries only the identifier of the second BP unit set.

Moreover, in a possible implementation, alternatively, the BP unit adjustment instruction may not carry the identifier of the second BP unit set, but is used to instruct the terminal to select one of a plurality of BP unit set switch patterns preconfigured by using higher layer signaling, that is, carries an identifier of a BP unit switch pattern. The base station sends information about a plurality of switch patterns to the terminal by using the higher layer signaling, for example, RRC signaling. The BP switch pattern herein is used to instruct UE to switch according to a configured preset rule. For example, it is assumed that a currently working BP of the UE is one BP unit. After 10 timeslots, the UE switches from a first BP set including one BP unit to a second BP set including two BP units. After 4 more timeslots, the UE switches from the second BP set back to the first BP set, and repeats the foregoing switch procedure. Alternatively, after 10 timeslots, the UE switches from a first BP set including one BP unit to a second BP set including two BP units.

Moreover, in a possible implementation, the second BP unit configuration information may carry a BP unit set switch pattern by using higher layer signaling, for example, RRC signaling. For example, it is assumed that a currently working BP of UE is a first BP set including one BP unit. After 10 timeslots, the UE switches from the first BP set including one BP unit to a second BP set including two BP units. After 4 more timeslots, the UE switches from the second BP back to the first BP set, and repeats the foregoing switch procedure.

In a possible design, the sending, by a base station, configuration information of at least two BP units to the terminal includes: adding, by the base station, a first parameter set of the at least two BP units configured based on the terminal to RRC signaling, and sending the RRC signaling to the terminal. A first parameter set of an $i^{th}$ BP unit configured based on the terminal includes at least one of: a frequency domain width and a position indication parameter of the $i^{th}$ BP unit configured based on the terminal, and a subcarrier spacing. When the $i^{th}$ BP unit configured based on the terminal includes a CORESET, the first parameter set of the $i^{th}$ BP unit configured based on the terminal further includes a frequency domain width and a position indication parameter of the CORESET corresponding to the $i^{th}$ BP unit configured based on the terminal, where i is a positive integer. When the $i^{th}$ BP unit configured based on the terminal includes the CORESET, the BP unit cannot be deactivated. Therefore, the base station may configure a different BP unit for each terminal by using the RRC signaling, to meet a service requirement of each terminal. Therefore, flexibility of the BP configuration is high.

In a possible design, the sending, by a base station, configuration information of at least two BP units to the terminal includes: broadcasting, by the base station, a first parameter set of the at least two BP units by using SIB information. A first parameter set of a $j^{th}$ BP unit includes at least one of: a frequency domain width and a position indication parameter of the $j^{th}$ BP unit, and a subcarrier spacing. When the $j^{th}$ BP unit includes a CORESET, the first parameter set of the $j^{th}$ BP unit further includes a frequency domain width and a position indication parameter of the CORESET corresponding to the $j^{th}$ BP unit, where j is a positive integer. The base station broadcasts the first parameter set of the at least two BP units by using the SIB information. As can be learned from this, the at least two BP units are not configured for a particular terminal, but are configured for all terminals in a cell.

In a possible design, the sending, by a base station, configuration information of at least two BP units to the terminal includes: adding, by the base station, a second parameter set of the at least two BP units configured based on the terminal to RRC signaling, and sending the RRC signaling to the terminal. A second parameter set of an $s^{th}$ BP unit configured based on the terminal includes at least one of: a frequency domain width and a position indication parameter of the $s^{th}$ BP unit configured based on the terminal. When the $s^{th}$ BP unit configured based on the terminal includes a CORESET, the second parameter set of the $s^{th}$ BP unit configured based on the terminal further includes a frequency domain width and a position indication parameter of the CORESET corresponding to the $s^{th}$ BP unit configured based on the terminal. The base station broadcasts subband configuration information by using SIB information. The subband configuration information includes at least one of: a frequency domain width and a position indication parameter of each subband, and a subcarrier spacing corresponding to each subband. The subband configuration information is used to indicate a subcarrier spacing corresponding to a second parameter set of each BP unit configured based on the terminal. A difference between the second parameter set of the at least two BP units configured based on the terminal and the first parameter set of the at least two BP units configured based on the terminal lies in that the second parameter set of the at least two BP units configured based on the terminal does not include the subcarrier spacing. The subcarrier spacing corresponding to the second parameter set of the BP unit configured based on the terminal may be implicitly indicated by using the subband configuration information broadcast by using the SIB information.

In a possible design, the sending, by a base station, configuration information of at least two BP units to a terminal includes: broadcasting, by the base station, a second parameter set of the at least two BP units and subband configuration information by using SIB information. A second parameter set of a $k^{th}$ BP unit includes at least one of: a frequency domain width and a position indication parameter of the $k^{th}$ BP unit. When the $k^{th}$ BP unit includes a CORESET, the second parameter set of the $k^{th}$ BP unit further includes a frequency domain width and a position indication parameter of the CORESET corresponding to the $k^{th}$ BP unit. The subband configuration information includes at least one of: a frequency domain width and a position indication parameter of each subband, and a subcarrier spacing corresponding to each subband. The subband configuration information is used to indicate a subcarrier spacing corresponding to a second parameter set of each BP unit. Therefore, flexibility of the BP configuration is ensured.

It should be understood that a difference between a configuration of a BP unit for the terminal and a configuration of a BP for the terminal lies in that the configuration of the BP unit for the terminal can reduce scheduling overheads on a network side.

The base station adds the BP unit adjustment instruction to DCI or a MAC CE, and sends the DCI or the MAC CE to the terminal.

According to a third aspect, an embodiment of this application provides a method for adjusting a terminal operating bandwidth, including: sending, by a base station, configuration information of at least two control resource sets CORESETs to a terminal; and sending, by the base station, a BP adjustment instruction to the terminal. The BP adjustment instruction carries an identifier of a second CORESET, and a frequency domain width and a position indication parameter of a BP in which the second CORESET is located. The second CORESET is one of the at least two CORESETs. The BP adjustment instruction is used to instruct the terminal to switch from a first currently working BP to a second BP in a specified timeslot after a BP unit adjustment instruction is received. The first BP is a currently working BP. The second BP is a BP indicated by the BP adjustment instruction. Therefore, the method provided in this application ensures flexible BP configuration, reduces network side overheads, and reduces terminal power consumption.

In a possible design, the sending, by a base station, configuration information of at least two CORESETs to a terminal includes: adding, by the base station, a first parameter set of the at least two CORESETs to RRC signaling. A first parameter set of each CORESET includes at least one of: a frequency domain width and a position indication parameter of the CORESET, and a subcarrier spacing. Therefore, flexibility of a BP configuration is ensured.

In a possible design, the sending, by a base station, configuration information of at least two CORESETs to a terminal includes: adding, by the base station, a second parameter set of the at least two CORESETs to RRC signaling, where a second parameter set of each CORESET includes at least one of: a frequency domain width and a position indication parameter of the CORESET; and broadcasting, by the base station, subband configuration information by using SIB information, where the subband configuration information includes at least one of: a frequency domain width and a position indication parameter of each subband, and a subcarrier spacing corresponding to each subband, and the subband configuration information is used to indicate a subcarrier spacing corresponding to the second parameter set of each CORESET. Therefore, flexibility of a BP configuration is ensured.

The base station adds the BP adjustment instruction to DCI or a MAC CE, and sends the DCI or the MAC CE to the terminal.

According to a fourth aspect, an embodiment of this application provides a method for adjusting a terminal operating bandwidth, including: receiving, by a terminal, configuration information of at least two bandwidth parts BPs that is sent by a base station; receiving, by the terminal, a BP adjustment instruction sent by the base station, where the BP adjustment instruction carries an identifier of a second BP, the second BP is one of the at least two BPs, the BP adjustment instruction is used to instruct the terminal to switch from a first BP to the second BP in a specified timeslot after a BP unit adjustment instruction is received, and the first BP is one of the at least two BPs; and switching, by the terminal, from the first BP to the second BP in the specified timeslot according to the BP adjustment instruction. Therefore, the method provided in this application ensures flexible BP configuration, reduces network side overheads, and reduces terminal power consumption.

In a possible design, the receiving, by a terminal, configuration information of at least two bandwidth parts BPs that is sent by a base station includes: receiving, by the terminal, Radio Resource Control RRC signaling sent by the base station, where the RRC signaling carries a first parameter set of the at least two BPs configured based on the terminal, where a first parameter set of each BP configured based on the terminal includes at least one of: a frequency domain width and a position indication parameter of the BP, a frequency domain width and a position indication parameter of a control resource set CORESET corresponding to the BP, and a subcarrier spacing.

In a possible design, the receiving, by a terminal, configuration information of at least two bandwidth parts BPs that is sent by a base station includes: receiving, by the terminal, system information block SIB information sent by the base station, where the SIB information carries a first parameter set of the at least two BPs. A first parameter set of each BP includes at least one of: a frequency domain width and a position indication parameter of the BP, a frequency domain width and a position indication parameter of a CORESET corresponding to the BP, and a subcarrier spacing.

In a possible design, the receiving, by a terminal, configuration information of at least two bandwidth parts BPs that is sent by a base station includes: receiving, by the terminal, RRC signaling sent by the base station, where the RRC signaling carries a second parameter set of at least two BPs configured based on the terminal, where a second parameter set of each BP configured based on the terminal includes at least one of: a frequency domain width and a position indication parameter of the BP, and a frequency domain width and a position indication parameter of a CORESET corresponding to the BP; and receiving, by the terminal, SIB information sent by the base station, where the SIB information carries subband configuration information, the subband configuration information includes at least one of: a frequency domain width and a position indication parameter of each subband, and a subcarrier spacing corresponding to each subband, and the subband configuration information is used to indicate a subcarrier spacing corresponding to the second parameter set of each BP configured based on the terminal.

In a possible design, the receiving, by a terminal, configuration information of at least two bandwidth parts BPs that is sent by a base station includes: receiving, by the terminal, SIB information sent by the base station, where the SIB information carries a second parameter set of the at least two BPs and subband configuration information. A second parameter set of each BP includes at least one of: a frequency domain width and a position indication parameter of the BP, and a frequency domain width and a position indication parameter of a CORESET corresponding to the BP. The subband configuration information includes at least one of: a frequency domain width and a position indication parameter of each subband, and a subcarrier spacing corresponding to each subband. The subband configuration information is used to indicate a subcarrier spacing corresponding to the second parameter set of each BP.

In a possible design, the specified timeslot is determined based on a timeslot occupied by the BP adjustment instruction sent by the base station, and a time sequence of a subcarrier spacing of a BP whose subcarrier spacing is smaller in a time sequence of a subcarrier spacing of a currently working BP and a time sequence of a subcarrier spacing of a target BP.

According to a fifth aspect, an embodiment of this application provides a method for adjusting a terminal operating bandwidth, including: receiving, by a terminal, configuration information of at least two bandwidth part BP units that is sent by a base station; receiving, by the terminal, a BP unit adjustment instruction sent by the base station, where the BP unit adjustment instruction carries an identifier of a second BP unit set, the second BP unit set includes at least one of at least two BP units, a BP adjustment instruction is used to instruct the terminal to switch from a first BP unit set to the second BP unit set in a specified timeslot after the BP unit adjustment instruction is received, the first BP unit set includes at least one BP unit including a CORESET, the second BP unit set includes at least one BP unit including a CORESET, and the first BP unit set is a currently working BP unit set; and switching, by the terminal, from the first BP unit set to the second BP unit set in the specified timeslot based on the BP unit adjustment instruction.

In a possible design, the receiving, by a terminal, configuration information of at least two BP units that is sent by a base station includes: receiving, by the terminal, RRC signaling sent by the base station, where the RRC signaling carries a first parameter set of at least two BP units configured based on the terminal. A first parameter set of an $i^{th}$ BP unit configured based on the terminal includes at least one of: a frequency domain width and a position indication parameter of the $i^{th}$ BP unit configured based on the terminal, and a subcarrier spacing. When the $i^{th}$ BP unit configured based on the terminal includes a CORESET, the first parameter set of the $i^{th}$ BP unit configured based on the terminal further includes a frequency domain width and a position indication parameter of the CORESET corresponding to the $i^{th}$ BP unit configured based on the terminal, where i is a positive integer.

In a possible design, the receiving, by a terminal, configuration information of at least two BP units that is sent by a base station includes: receiving, by the terminal, SIB information sent by the base station. The SIB information carries a first parameter set of the at least two BP units. A first parameter set of a $j^{th}$ BP unit includes at least one of: a frequency domain width and a position indication parameter of the $j^{th}$ BP unit, and a subcarrier spacing. When the $j^{th}$ BP unit includes a CORESET, the first parameter set of the $j^{th}$ BP unit further includes a frequency domain width and a position indication parameter of the CORESET corresponding to the $j^{th}$ BP unit, where j is a positive integer.

In a possible design, the receiving, by a terminal, configuration information of at least two BP units that is sent by a base station includes: receiving, by the terminal, RRC signaling sent by the base station, where the RRC signaling carries a second parameter set of the at least two BP units configured based on the terminal, where a second parameter set of an $s^{th}$ BP unit configured based on the terminal includes at least one of: a frequency domain width and a position indication parameter of the $s^{th}$ BP unit configured based on the terminal, when the $s^{th}$ BP unit configured based on the terminal includes a CORESET, the second parameter set of the $s^{th}$ BP unit configured based on the terminal further includes a frequency domain width and a position indication parameter of the CORESET corresponding to the $s^{th}$ BP unit configured based on the terminal; and receiving, by the terminal, SIB information sent by the base station, where the SIB information carries subband configuration information, the subband configuration information includes at least one of: a frequency domain width and a position indication parameter of each subband, and a subcarrier spacing corresponding to each subband, and the subband configuration information is used to indicate a subcarrier spacing corresponding to a second parameter set of each BP unit configured based on the terminal.

In a possible design, the receiving, by a terminal, configuration information of at least two BP units that is sent by a base station includes: receiving, by the terminal, SIB information sent by the base station. The SIB information carries a second parameter set of the at least two BP units and subband configuration information. A second parameter set of a $k^{th}$ BP unit includes at least one of: a frequency domain width and a position indication parameter of the $k^{th}$ BP unit. When the $k^{th}$ BP unit includes a CORESET, the second parameter set of the $k^{th}$ BP unit further includes a frequency domain width and a position indication parameter of the CORESET corresponding to the $k^{th}$ BP unit. The subband configuration information includes at least one of: a frequency domain width and a position indication parameter of each subband, and a subcarrier spacing corresponding to each subband. The subband configuration information is used to indicate a subcarrier spacing corresponding to a second parameter set of each BP unit.

According to a sixth aspect, an embodiment of this application provides a method for adjusting a terminal operating bandwidth, including: sending, by a terminal, configuration information of at least two control resource sets CORESETs to a base station; receiving, by the terminal, a BP adjustment instruction sent by the base station, where the BP adjustment instruction carries an identifier of a second CORESET, and a frequency domain width and a position indication parameter of a BP in which the second CORESET is located, the second CORESET is one of the at least two CORESETs, the BP adjustment instruction is used to instruct the terminal to switch from a first currently working BP to a second BP in a specified timeslot after a BP unit adjustment instruction is received, the first BP is a currently working BP, and the second BP is a BP indicated by the BP adjustment instruction; and switching, by the terminal, from the first BP to the second BP in the specified timeslot according to the BP adjustment instruction.

In a possible design, the sending, by a terminal, configuration information of at least two CORESETs to a base station includes: receiving, by the terminal, RRC signaling sent by the base station. The RRC signaling carries a first parameter set of the at least two CORESETs. A first parameter set of each CORESET includes at least one of: a frequency domain width and a position indication parameter of the CORESET, and a subcarrier spacing.

In a possible design, the sending, by a terminal, configuration information of at least two CORESETs to a base station includes: receiving, by the terminal, RRC signaling sent by the base station, where the RRC signaling carries a second parameter set of the at least two CORESETs, and second parameter set of each CORESET includes at least one of: a frequency domain width and a position indication parameter of the CORESET; and receiving, by the terminal, SIB information sent by the base station, where the SIB information carries subband configuration information, the subband configuration information includes at least one of: a frequency domain width and a position indication parameter of each subband, and a subcarrier spacing corresponding to each subband, and the subband configuration information is used to indicate a subcarrier spacing corresponding to the second parameter set of each CORESET.

Moreover, in an application scenario in which only one numerology can be used in a working BP of UE, as shown in FIG. 8, for a carrier, a first reference signal (for example, a CSI-RS, or an SRS) has only one subcarrier spacing. For example, a subcarrier spacing in a carrier is fixed at 30 kHz. A size of the subcarrier spacing is predefined in a protocol or configured by using a system broadcast message. In the carrier, a UE-specific BP may be configured by using RRC signaling, or a cell-specific BP may be configured by using a broadcast message such as SIB signaling. The BP may use different subcarrier spacings, or may use a same subcarrier spacing.

In this scenario, in a working BP of the UE, in a scheduling unit (for example, a timeslot, a mini-slot, a subframe, aggregated timeslots, aggregated mini-slots, or aggregated subframes), data may have a subcarrier spacing different from the subcarrier spacing of the first reference signal. As shown in FIG. 8, UE 1 is in a scheduling unit n, where n is a positive integer greater than or equal to zero. The subcarrier spacing of the data is 15 kHz. The subcarrier spacing of the first reference signal is 30 kHz. The data of the UE 1 can have only one subcarrier spacing. To be specific, the UE uses only one subcarrier spacing to transmit and receive data in one scheduling unit.

In the scenario, for a working BP of the UE, when data resource mapping is performed on a base station side or a terminal side, there may be different resource mapping manners based on a relationship between a subcarrier spacing of data in a subband and a subcarrier spacing of the first reference signal in the scheduling unit. When the subcarrier spacing of the data is the same as the subcarrier spacing of the first reference signal, the data of the UE, for example, the UE 1 shown in FIG. 8, may be mapped to a resource element that is not mapped in a symbol in which the first reference signal is located. The subcarrier spacing of the BP of the UE is the same as the subcarrier spacing of the first reference signal. The data may be mapped in an RE that is not used to transmit a reference signal in the symbol and that is occupied by the first reference signal. When the subcarrier spacing of the data is different from the subcarrier spacing of the first reference signal, the data of the UE, for example, UE 2 shown in FIG. 8, may not be mapped to a resource element that is not mapped in a symbol in which the first reference signal is located. The subcarrier spacing of the BP of the UE is different from the subcarrier spacing of the first reference signal. The data is not mapped in an RE that is not used to transmit a reference signal in the symbol and that is occupied by the first reference signal, but is reserved.

In an application scenario in which more than one numerology may be used in a working BP of UE, as shown in FIG. 9, in the scenario, for a carrier, a first reference signal (for example, a CSI-RS, or an SRS) has only one subcarrier spacing. For example, a subcarrier spacing in a carrier is fixed at 30 kHz. A size of the subcarrier spacing is predefined in a protocol or configured by using a system broadcast message. In the carrier, a UE-specific BP may be configured by using RRC signaling, or a cell-specific BP may be configured by using a broadcast message such as SIB signaling. Referring to the figure, the figure is a schematic diagram of division of subbands of 15 kHz and 30 kHz in a carrier. In the scenario, for UE, there may be m subcarrier spacings of data in a scheduling unit, where m is a positive integer greater than or equal to 1, for example, 1, 2, or 3. UE may receive or send data of m subcarrier spacings in a scheduling unit. As shown in the figure, in a scheduling unit n, the UE 1 receives or sends data of 15 kHz and data of 30 kHz, and receives or sends a first reference signal of 30 kHz. When data resource mapping is performed on a base station side or a terminal side, there may be different resource mapping manners based on a relationship between a subcarrier spacing of data and a subcarrier spacing of the first reference signal in the minimum resource allocation unit (for example, a PRB). When the subcarrier spacing of the data is the same as the subcarrier spacing of the first reference signal, the data of the UE may be mapped to a resource element that is not mapped in a symbol in which the first reference signal is located, as shown in an upper half of the UE 1 in FIG. 9. When the subcarrier spacing of the data is different from the subcarrier spacing of the first reference signal, the data of the UE cannot be mapped to the resource element that is not mapped in the symbol in which the first reference signal is located, as shown in a lower half of the UE 1 in the figure (an unused RE in a part, which is the same as the subcarrier spacing of the first reference signal, in the working BP of the UE may be used to map the data, and an unused RE in a part, which is different from the subcarrier spacing of the first reference signal, in the working BP of the UE is reserved and is not used to map the data).

According to a seventh aspect, an embodiment of this application provides a communications apparatus, including: a transceiver, at least one processor, and a memory. The transceiver, the processor, and the memory are coupled by using a bus. The transceiver is responsible for communication between the communications apparatus and another communications apparatus. There is a program instruction in the memory. The at least one processor executes the program instruction, to perform an operation of the method according to the first aspect or any possible designed method of the first aspect.

According to an eighth aspect, an embodiment of this application provides a communications apparatus, including: a transceiver, at least one processor, and a memory. The transceiver, the processor, and the memory are coupled by using a bus. The transceiver is responsible for communication between the communications apparatus and another communications apparatus. There is a program instruction in the memory. The at least one processor executes the program instruction, to perform an operation of the method according to the second aspect or any possible designed method of the second aspect.

According to a ninth aspect, an embodiment of this application provides a communications apparatus, including: a transceiver, at least one processor, and a memory. The transceiver, the processor, and the memory are coupled by using a bus. The transceiver is responsible for communication between the communications apparatus and another communications apparatus. There is a program instruction in the memory. The at least one processor executes the program instruction, to perform an operation of the method according to the third aspect or any possible designed method of the third aspect.

According to a tenth aspect, an embodiment of this application provides a communications apparatus, including: a transceiver, at least one processor, and a memory. The transceiver, the processor, and the memory are coupled by using a bus. The transceiver is responsible for communication between the communications apparatus and another communications apparatus. There is a program instruction in the memory. The at least one processor executes the program instruction, to perform an operation of the method according to the fourth aspect or any possible designed method of the fourth aspect.

According to an eleventh aspect, an embodiment of this application provides a communications apparatus, including: a transceiver, at least one processor, and a memory. The transceiver, the processor, and the memory are coupled by using a bus. The transceiver is responsible for communication between the communications apparatus and another communications apparatus. There is a program instruction in the memory. The at least one processor executes the program instruction, to perform an operation of the method according to the fifth aspect or any possible designed method of the fifth aspect.

According to a twelfth aspect, an embodiment of this application provides a communications apparatus, including: a transceiver, at least one processor, and a memory. The transceiver, the processor, and the memory are coupled by using a bus. The transceiver is responsible for communication between the communications apparatus and another communications apparatus. There is a program instruction in the memory. The at least one processor executes the program instruction, to perform an operation of the method according to the sixth aspect or any possible designed method of the sixth aspect.

According to a thirteenth aspect, this application provides a computer readable storage medium. The computer readable storage medium stores an instruction. When the instruction runs on a computer, the computer is caused to perform the method according to the foregoing aspects.

According to a fourteenth aspect, this application further provides a computer program product including an instruc-

DETAILED DESCRIPTION OF ILLUSTRATIVE EMBODIMENTS

The following describes the embodiments of this application with reference to accompanying drawings.

It should be understood that in this application, a BP is a segment of continuous resources in a frequency domain. Optionally, one BP includes K continuous subcarriers, where K is an integer greater than 0. Alternatively, optionally, one BP is a frequency domain resource in which N continuous non-overlapping physical resource blocks (Physical Resource Block, PRB) are located, where N is an integer greater than 0. A subcarrier spacing of the PRB is 15 k, 30 k, 60 k, or the like. Alternatively, optionally, one BP is a frequency domain resource in which N continuous non-overlapping PRB groups are located, and one PRB group includes M continuous PRBs, where N and M integers greater than 0. A subcarrier spacing of the PRB is 15 k, 30 k, 60 k, or the like. Alternatively, optionally, for user equipment, a length of a BP is less than or equal to a maximum bandwidth supported by the user equipment.

In this application, a BP unit may also be referred to as a BP unit, and is a minimum unit allocated by the BP, or subbands of K predefined continuous PRBs that use predefined subcarrier spacings.

In this application, a subcarrier spacing needs to be configured when a base station configures any one of a BP, or a BP unit, or a control resource set (CORESET) for a terminal. It should be noted that the subcarrier spacing herein is merely an example, and a time unit type, a CP type, or the like may further be used. These parameters may be collectively referred to as a parameter set (numerology) related to the subcarrier spacing. For example, the CP type may be a normal CP (NCP) or an extended CP (ECP). The time unit type may be a slot format.

Figure 1:
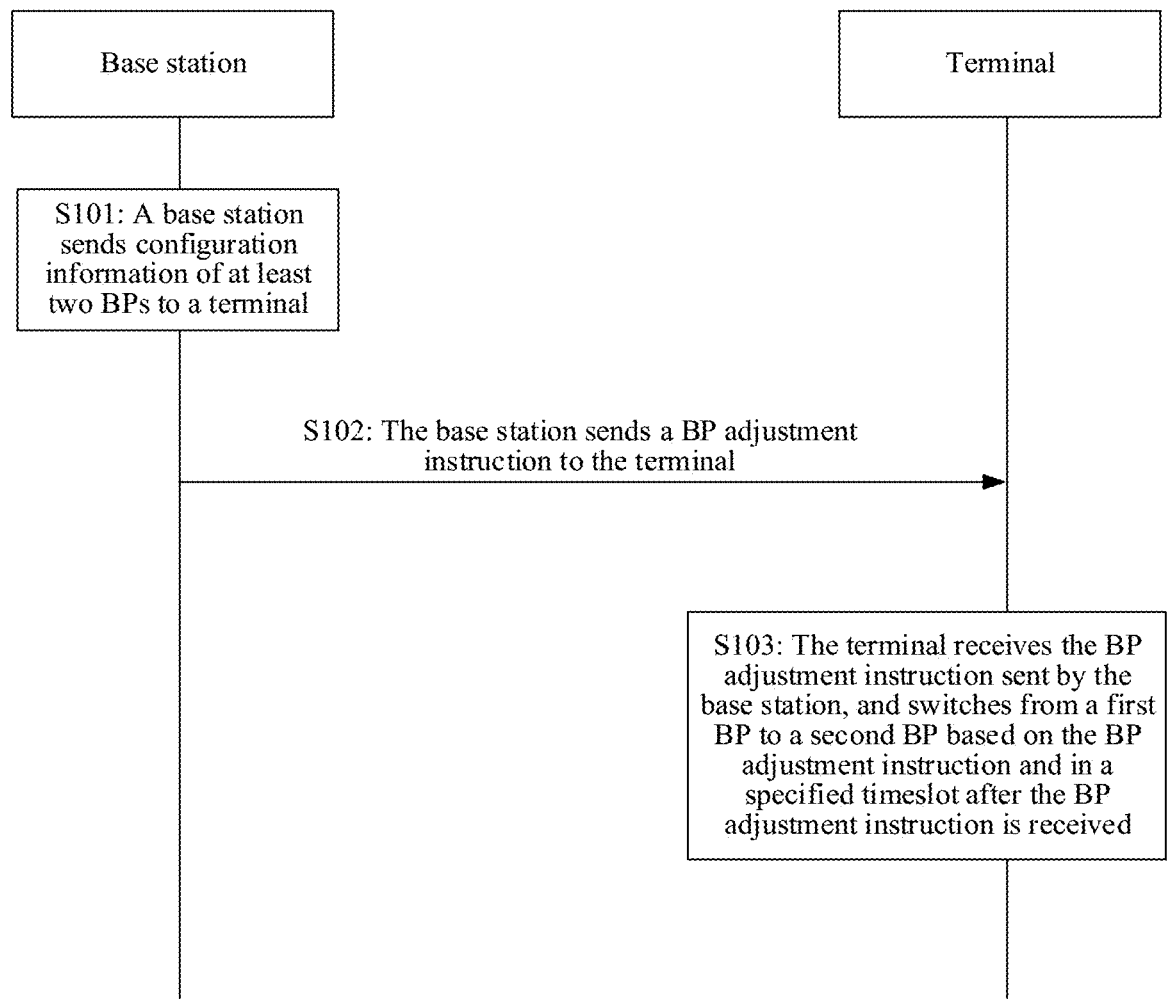
FIG. 1 is a first overview flowchart for adjusting a terminal operating bandwidth according to an embodiment of this application.

Referring to FIG. 1, this application provides a method for adjusting a terminal operating bandwidth, including the following steps.

Step 101: A base station sends configuration information of at least two BPs to a terminal.

Step 102: The base station sends a BP adjustment instruction to the terminal.

The BP adjustment instruction carries an identifier of a second BP. The second BP is one of the at least two BPs. The BP adjustment instruction is used to instruct the terminal to switch from a first BP to the second BP in a specified timeslot, in other words, switch from a currently working BP to a target BP.

The first BP is one of the at least two BPs. For example, the first BP may be a currently working BP, and the second BP is a target BP. The at least two BPs herein may be candidate BPs. The second BP may be determined from the candidate BPs.

It should be understood that the BP configuration information herein may be first configuration information, and the BP adjustment instruction herein may further be second configuration information. A difference lies in that the second configuration information carries only the identifier of the second BP.

Moreover, in a possible implementation, alternatively, the BP adjustment instruction may not carry the identifier of the second BP, but is used to instruct the terminal to select one of a plurality of switch patterns preconfigured by using higher layer signaling, that is, carries an identifier of a BP switch pattern. The base station sends information about a plurality of switch patterns to the terminal by using the higher layer signaling, for example, RRC signaling. The BP switch pattern herein is used to instruct UE to switch according to a configured preset rule. For example, it is assumed that a currently working BP of the UE is the first BP. After 10 timeslots, the UE switches from the first BP to the second BP. After 4 more timeslots, the UE switches from the second BP back to the first BP, and repeats the foregoing switch procedure. Alternatively, after 10 timeslots, the UE switches from the first BP to the second BP, and keeps working in the second BP.

Figure 3:
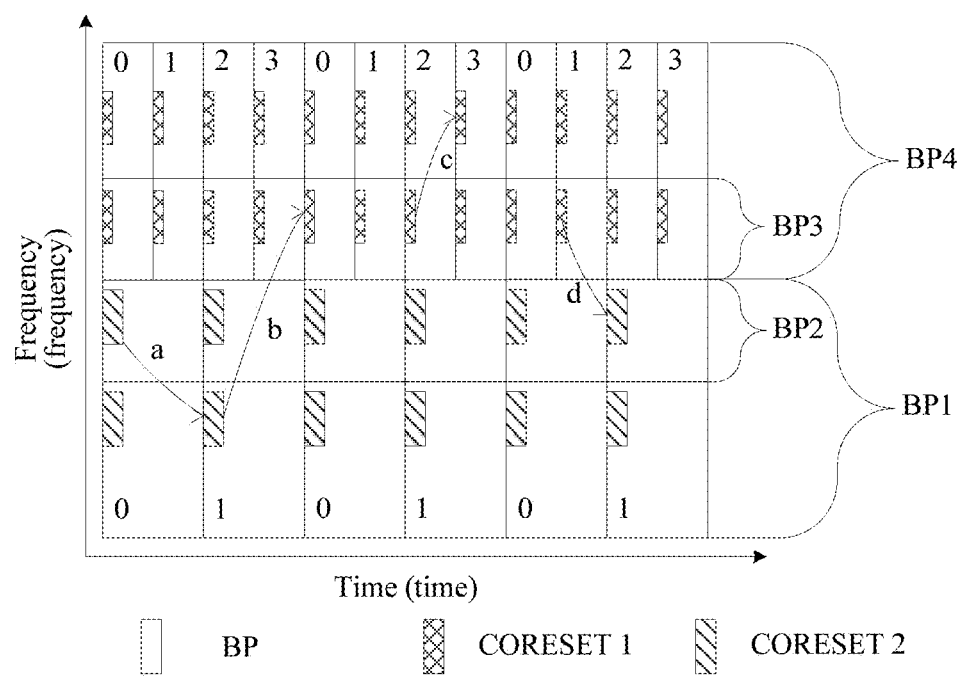
FIG. 3 is a schematic configuration diagram of a BP according to an embodiment of this application.

For example, as shown in FIG. 3, the sending, by the base station, information about a plurality of switch patterns to the terminal by using the higher layer signaling, for example, RRC signaling includes: a pattern 1: after 2 slots, switching from the BP 1 to the BP 2, and after 4 more slots, switching from the BP 2 back to the BP 1; and a pattern 2: after 2 slots, switching from the BP 1 to the BP 2.

Further, the BP adjustment instruction may carry an identifier of any one of the foregoing switch patterns, to instruct the terminal whether to use the pattern 1 or the pattern 2 to perform BP switch.

Moreover, in a possible implementation, the second configuration information may carry the BP switch pattern by using the higher layer signaling, for example, the RRC signaling. For example, as shown in FIG. 3, the base station sends information about a switch pattern to the terminal by using the higher layer signaling, for example, the RRC signaling. To be specific, after 2 slots, the terminal switches from the BP 1 to the BP 2, and after 4 more slots, the terminal switches from the BP 2 back to the BP 1.

For example, the base station selects the second BP from the at least two BPs based on a service requirement of the terminal.

In a possible implementation, the base station adds the BP adjustment instruction to downlink control information (DCI) or a Media Access Control control element (MAC CE), and sends the DCI or the MAC CE to the terminal.

Figure 2:
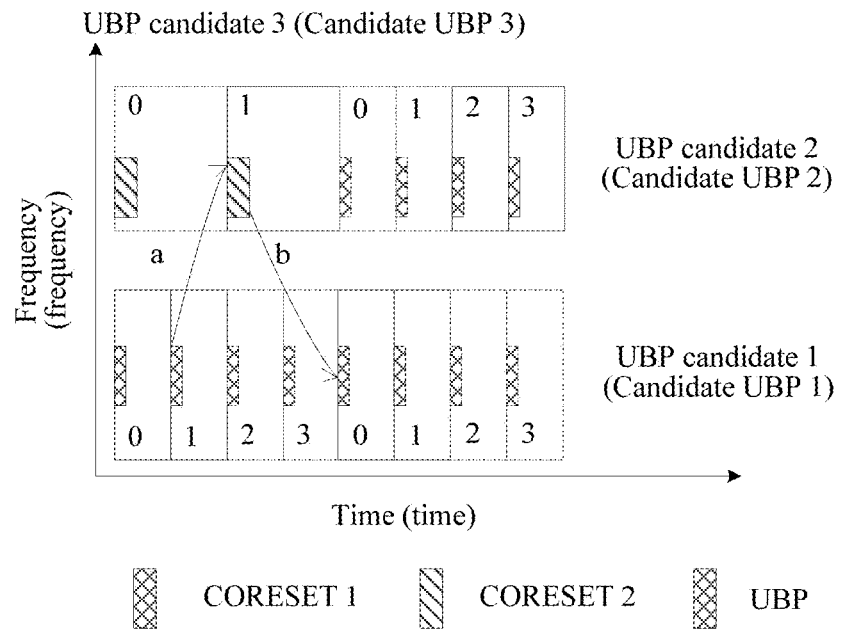
FIG. 2 is a schematic configuration diagram of a UBP according to an embodiment of this application.

As shown in FIG. 2, a numerology of a user-specific BP (UBP) 1 is 30 kHz, and a numerology of a UBP 3 is 15 kHz. When the UE needs to use a numerology of 15 kHz, the base station determines that the UBP 3 is a target BP. As shown by an arrow a in FIG. 2, the base station adds the BP adjustment instruction to DCI in a timeslot 1 by using the UBP 1, and sends the DCI to the terminal, to instruct the UE to switch from the UBP 1 to the UBP 3 in the slot 1 of the UBP 3.

Step 103: The terminal receives the BP adjustment instruction sent by the base station, and switches from a first BP to a second BP according to the BP adjustment instruction and in a specified timeslot after a BP unit adjustment instruction is received.

For step 101, the base station may configure the at least two BPs for the terminal by using, but not limited to, the following four manners.

In a first manner: the base station adds a first parameter set of the at least two BPs configured based on the terminal to Radio Resource Control (RRC) signaling, and sends the RRC signaling to the terminal.

A first parameter set of each BP configured based on the terminal includes at least one of: a frequency domain width and a position indication parameter of the BP, a frequency domain width and a position indication parameter of a CORESET corresponding to the BP, and a subcarrier spacing.

The frequency domain width of the CORESET is less than or equal to the frequency domain width of the BP. A frequency domain position of the CORESET is one part or all of a frequency domain position of the BP.

For example, if a frequency domain width of a BP is 30 M, and a start position indicated by the position indication parameter is 10 M, a frequency domain occupied by the BP is 10 M to 40 M, and a subcarrier spacing is 15 kHz. Alternatively, if a start position indicated by a position indication parameter of a BP is 10 M, and an end position is 30 M, a frequency domain width of the BP is 20 M, and may be implicitly provided.

For another example, as shown in FIG. 2, the base station configures three UBPs for the terminal, each UBP includes one CORESET, a numerology of a UBP 1 is 30 kHz, a numerology of a UBP 2 is 30 kHz, and a numerology of a UBP 3 is 15 kHz. Although the numerology of the UBP 1 is the same as the numerology of the UBP 2, because a frequency domain width and position indication information of the UBP 1 are different from those of the UBP 2, the UBP 1 and the UBP 2 are different UBPs. Although a frequency bandwidth and a position indication parameter of the UBP 2 are the same as those of the UBP 3, because the numerology of the UBP 2 is different from the numerology of the UBP 3, the UBP 1 and the UBP 3 indicate different UBPs.

Therefore, the base station may configure a different UBP for each terminal by using the RRC signaling, to meet a service requirement of each terminal. Therefore, flexibility of the BP configuration is high.

In a second manner: the base station broadcasts a first parameter set of the at least two BPs by using system information block (SIB) information.

A first parameter set of each BP includes at least one of: a frequency domain width and a location indication parameter of the BP, a frequency domain width and a location indication parameter of a CORESET corresponding to the BP, and a subcarrier spacing.

Different from the first manner, in the second manner, the base station broadcasts the first parameter set of the at least two BPs by using the SIB information. As can be learned from this, the at least two BPs are not configured for a particular terminal, but are configured for all terminals in a cell. In this case, to reduce scheduling signaling overheads on a network side, and reduce terminal power consumption, some BPs with relatively small bandwidths may be configured, so that a terminal having an energy saving requirement can work in these BPs with relatively small bandwidths.

The BP herein may be a cell-specific BP or a carrier-specific BP.

For example, as shown in FIG. 3, the base station configures four BPs for the terminal, each BP includes one CORESET, a numerology of a BP 1 is 15 kHz, a numerology of a BP 2 is 15 kHz, a numerology of a BP 3 is 30 kHz, and a numerology of a BP 4 is 30 kHz. The bandwidths of the BP 2 and the BP 3 are smaller, to implement relatively low scheduling signaling overheads on a network side. It should be noted that, although the numerology of the BP 1 is the same as the numerology of the BP 2, because a frequency bandwidth and position indication information of the BP 1 are different from those of the BP 2, the BP 1 and the BP 2 indicate different BPs. Similarly, the BP 3 and the BP 4 indicate different BPs.

Further, when the UE needs to use a numerology of 15 kHz, and the UE has a relatively low data service requirement, as shown by an arrow d in FIG. 3, the base station adds a BP adjustment instruction to DCI in a timeslot 1 by using the BP 3, and sends the DCI to the UE, to instruct the UE to switch from the BP 3 to the BP 2 in a next timeslot. When the data service requirement of the UE becomes high, as shown by an arrow a in FIG. 3, DCI signaling in the BP 2 carries a BP adjustment instruction and is sent to the UE, to instruct the UE to switch from the BP 2 to the BP 1 with a larger bandwidth in a next timeslot. When the UE data service becomes small, but a requirement on a delay is relatively high, as shown by an arrow b in FIG. 3, DCI signaling in the BP 1 carries a BP adjustment instruction and is sent to the UE, to instruct the UE to switch from the BP 1 to the BP 3 with a relatively small bandwidth but a larger subcarrier spacing of 30 kHz in a next timeslot. When the UE data service becomes large, and a requirement on a delay is higher, as shown by an arrow c in FIG. 3, DCI signaling in the BP 3 carries a BP adjustment instruction and is sent to the UE, to instruct the UE to switch from the BP 3 to the BP 4 in a next timeslot. Each specified timeslot in FIG. 3 is a next timeslot.

In a third manner: the base station adds a second parameter set of at least two BPs configured based on the terminal to RRC signaling, and sends the RRC signaling to the terminal, where a second parameter set of each BP configured based on the terminal includes at least one of: a frequency domain width and a location indication parameter of the BP, and a frequency domain width and a location indication parameter of a CORESET corresponding to the BP.

As can be learned from the foregoing description, a difference between the second parameter set of the at least two BPs configured based on the terminal and the first parameter set of the at least two BPs configured based on the terminal lies in that the second parameter set of the at least two BPs configured based on the terminal does not include the subcarrier spacing. The subcarrier spacing corresponding to the second parameter set of the BP configured based on the terminal may be implicitly indicated by using subband configuration information broadcast by using the SIB information.

Specifically, the base station broadcasts the subband configuration information by using the SIB information. The subband configuration information includes at least one of: a frequency domain width and a location indication parameter of each subband, and a subcarrier spacing corresponding to each subband. The subband configuration information is used to indicate a subcarrier spacing corresponding to the second parameter set of each BP configured based on the terminal.

A difference between the third manner and the first manner lies in that the subcarrier spacing is implicitly indicated and is not directly indicated by the RRC signaling.

For example, assuming that a carrier bandwidth is 100 M, the second parameter set of the at least two BPs configured based on the terminal includes: a BP 1, with a frequency bandwidth of 30 M, and a position indication parameter ranging from 0 M to 30 M; and a BP 2, with a frequency bandwidth of 10 M, and a position indication parameter ranging from 50 M to 60 M.

The subband configuration information includes: a first subband, with a frequency bandwidth of 50 M, a position indication parameter ranging from 0 M to 50 M, and a subcarrier spacing of 15 kHz; and a second subband, with a frequency bandwidth of 50 M, a position indication parameter ranging from 50 M to 100 M, and a subcarrier spacing of 30 kHz.

As can be learned from the foregoing description, the BP 1 belongs to the first subband, the subcarrier spacing of the first subband is 15 kHz, the BP 2 belongs to the second subband, and the subcarrier spacing of the second subband is 30 kHz.

Therefore, the RRC signaling may not indicate the subcarrier spacing of each BP, but the subband configuration information implicitly indicates the subcarrier spacing of each BP, thereby reducing overheads of the RRC signaling, and ensuring flexibility of the BP configuration.

In a fourth manner: the base station broadcasts a second parameter set and subband configuration information of at least two BPs by using SIB information.

A second parameter set of each BP includes at least one of: a frequency domain width and a position indication parameter of the BP, and a frequency domain width and a position indication parameter of a CORESET corresponding to the BP. The subband configuration information includes at least one of: a frequency domain width and a position indication parameter of each subband, and a subcarrier spacing corresponding to each subband. The subband configuration information is used to indicate a subcarrier spacing corresponding to the second parameter set of each BP.

Similar to the third manner, in the fourth manner, the subcarrier spacing is also implicitly indicated, but the second parameter set and the subband configuration information of the at least two BPs are both broadcast by using SIB information, and the at least two BPs are not configured for a particular terminal, but are configured for all terminals in a cell.

Moreover, the specified timeslot is determined based on a timeslot occupied by the BP adjustment instruction sent by the base station, and a time sequence of a subcarrier spacing of a BP whose subcarrier spacing is smaller in a time sequence of a subcarrier spacing of a currently working BP and a time sequence of a subcarrier spacing of a target BP.

For example, as shown by the arrow a shown in FIG. 2, the base station adds the BP adjustment instruction to the DCI in the timeslot 1 by using the UBP 1, and sends the DCI to the UE, to instruct the UE to switch from the UBP 1 to the UBP 3 in the timeslot 1 of the UBP 3. If the base station adds the BP adjustment instruction to DCI in a timeslot 0 by using the UBP 1, and sends the DCI to the UE, the UE is instructed to switch from the UBP 1 to the UBP 3 in the timeslot 1 of the UBP 3. Therefore, the UE is instructed to switch from the UBP 1 to the UBP 3 in the timeslot 1 of the UBP 3 regardless of whether the base station sends the BP adjustment instruction in the timeslot 1 or the timeslot 0 by using the UBP 1.

For another example, as shown by the arrow b, the base station adds the BP adjustment instruction to the DCI in the timeslot 1 by using the UBP 3, and sends the DCI to the UE, to instruct the UE to switch from the UBP 3 to the UBP 1 in a timeslot 0 of the UBP 1, instead of from the UBP 1 to the UBP 3 in a timeslot 3 of the UBP 1.

As can be learned from the foregoing two examples, in a process of switching from the currently working BP to the target BP, the BP whose subcarrier spacing is smaller needs to be used as a reference. Otherwise, for a UBP timeslot, a cross-subframe border problem, or a cross-timeslot border problem, or a cross-symbol border problem may be caused, and a timing disorder may be further caused.

Figure 4:
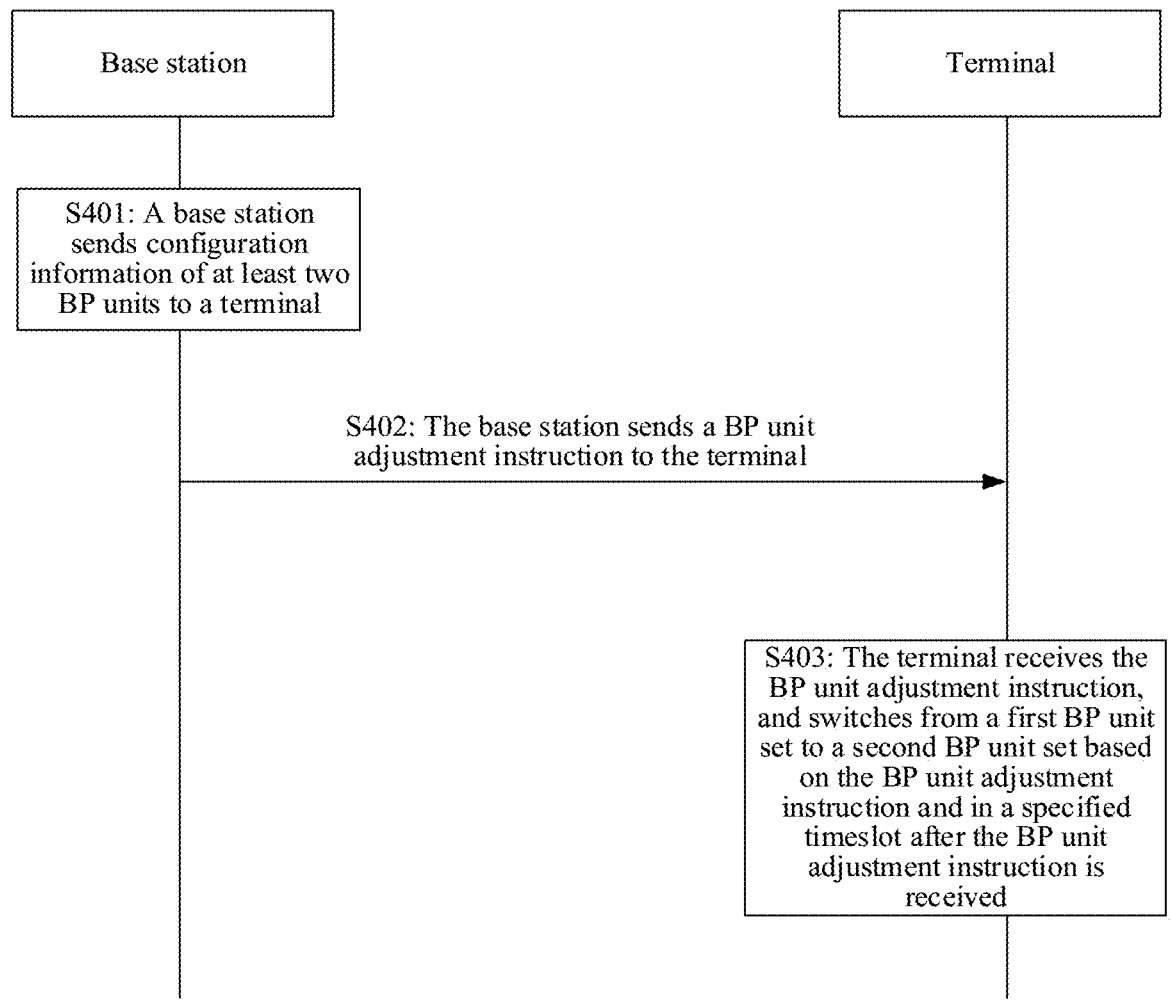
FIG. 4 is a second overview flowchart for adjusting a terminal operating bandwidth according to an embodiment of this application.

Referring to FIG. 4, an embodiment of this application provides a method for adjusting a terminal operating bandwidth, including the following steps.

Step 401: A base station sends configuration information of at least two BP units to a terminal.

Step 402: The base station sends a BP unit adjustment instruction to the terminal.

The BP unit adjustment instruction carries an identifier of a second BP unit set. The second BP unit set includes at least one of the at least two BP units. A BP adjustment instruction is used to instruct the terminal to switch from a first BP unit set to the second BP unit set in a specified timeslot after the BP unit adjustment instruction is received. There is at least one BP unit including a CORESET in the second BP unit set.

The first BP unit set is a currently working BP unit set. The second BP unit set is a target BP unit set. The first BP unit set includes at least one BP unit including a CORESET. The second BP unit set includes at least one BP unit including a CORESET.

It should be understood that the BP unit configuration information herein may be first BP unit configuration information, and the BP unit adjustment instruction herein may further be second BP unit configuration information. A difference lies in that the second BP unit configuration information carries only the identifier of the second BP unit set.

Moreover, in a possible implementation, alternatively, the BP unit adjustment instruction may not carry the identifier of the second BP unit set, but is used to instruct the terminal to select one of a plurality of BP unit set switch patterns preconfigured by using higher layer signaling, that is, carries an identifier of a BP unit switch pattern. The base station sends information about a plurality of switch patterns to the terminal by using the higher layer signaling, for example, RRC signaling. The BP switch pattern herein is used to instruct UE to switch according to a configured preset rule. For example, it is assumed that a currently working BP of the UE is one BP unit. After 10 timeslots, the UE switches from a first BP set including one BP unit to a second BP set including two BP units. After four more timeslots, the UE switches from the second BP set back to the first BP set, and repeats the foregoing switch procedure. Alternatively, after 10 timeslots, the UE switches from a first BP set including one BP unit to a second BP set including two BP units.

Moreover, in a possible implementation, in an implementation of the second BP unit configuration information, a BP unit set switch pattern may be carried in higher layer signaling, for example, RRC signaling. For example, it is assumed that a currently working BP of UE is a first BP set including one BP unit. After 10 timeslots, the UE switches from the first BP set including one BP unit to a second BP set including two BP units. After four more timeslots, the UE switches from the second BP back to the first BP set, and repeats the foregoing switch procedure.

In a possible implementation, the base station adds the BP unit adjustment instruction to DCI or a MAC CE, and sends the DCI or the MAC CE to the terminal.

Step 403: The terminal receives the BP unit adjustment instruction, and switches from a first BP unit set to a second BP unit set based on a BP unit adjustment instruction and in a specified timeslot after the BP unit adjustment instruction is received.

For step 401, the base station may configure the at least two BP units for the terminal by using, but not limited to, the following four manners.

In a first manner: the base station adds a first parameter set of at least two BP units configured based on the terminal to RRC signaling, and sends the RRC signaling to the terminal.

A first parameter set of an $i^{th}$ BP unit configured based on the terminal includes at least one of: a frequency domain width and a position indication parameter of the $i^{th}$ BP unit configured based on the terminal, and a subcarrier spacing. When the $i^{th}$ BP unit configured based on the terminal includes a CORESET, the first parameter set of the $i^{th}$ BP unit configured based on the terminal further includes a frequency domain width and a position indication parameter of the CORESET corresponding to the $i^{th}$ BP unit configured based on the terminal, where i is a positive integer.

It should be understood that, when the $i^{th}$ BP unit configured based on the terminal includes the CORESET, the BP unit cannot be deactivated.

Therefore, the base station may configure a different BP unit for each terminal by using the RRC signaling, to meet a service requirement of each terminal. Therefore, flexibility of the BP configuration is high.

Figure 5:
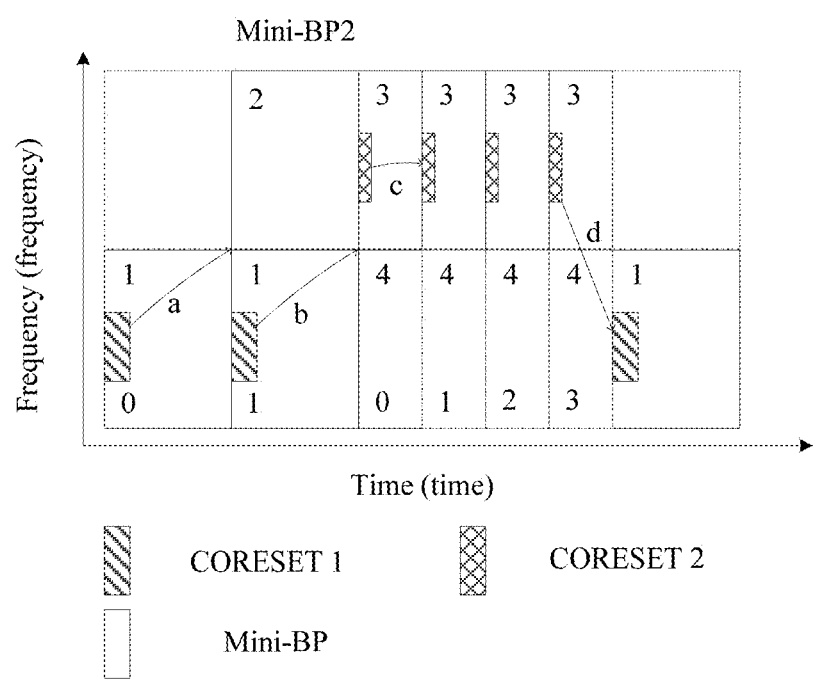
FIG. 5 is a schematic configuration diagram of mini-BPs according to an embodiment of this application.

For example, as shown in FIG. 5, the base station configures four BP units, for example, mini-BPs, for the terminal. An identifier of the mini-BPs is indicated in an upper left corner of the figure. A numerology of a mini-BP 1 and a mini-BP 2 is 15 kHz. The mini-BP1 includes a CORESET, and the mini-BP 2 does not include any CORESET. A numerology of a mini-BP 3 and a mini-BP 4 is 30 kHz. The mini-BP 3 includes a CORESET, and the mini-BP 4 does not include any CORESET.

In a second manner: the base station broadcasts a first parameter set of at least two BP units by using SIB information.

A first parameter set of a $j^{th}$ BP unit includes at least one of: a frequency domain width and a position indication parameter of the $j^{th}$ BP unit, and a subcarrier spacing. When the $j^{th}$ BP unit includes a CORESET, the first parameter set of the $j^{th}$ BP unit further includes a frequency domain width and a position indication parameter of the CORESET corresponding to the $j^{th}$ BP unit, where j is a positive integer.

Different from the first manner, in the second manner, the base station broadcasts the first parameter set of the at least two BP units by using the SIB information. As can be learned from this, the at least two BP units are not configured for a particular terminal, but are configured for all terminals in a cell.

In a third manner: the base station adds a second parameter set of at least two BP units configured based on the terminal to RRC signaling, and sends the RRC signaling to the terminal, where a second parameter set of an $s^{th}$ BP unit configured based on the terminal includes at least one of: a frequency domain width and a position indication parameter of the $s^{th}$ BP unit configured based on the terminal, and when the $s^{th}$ BP unit configured based on the terminal includes a CORESET, the second parameter set of the $s^{th}$ BP unit configured based on the terminal further includes a frequency domain width and a position indication parameter of the CORESET corresponding to the $s^{th}$ BP unit configured based on the terminal.

As can be learned from the foregoing description, a difference between the second parameter set of the at least two BP units configured based on the terminal and the first parameter set of the at least two BP units configured based on the terminal lies in that the second parameter set of the at least two BP units configured based on the terminal does not include the subcarrier spacing. The subcarrier spacing corresponding to the second parameter set of the BP unit configured based on the terminal may be implicitly indicated by using the subband configuration information broadcast by using the SIB information. This is similar to the third manner in the embodiment corresponding to FIG. 1. Repeated content is not described again.

The base station broadcasts the subband configuration information by using the SIB information. The subband configuration information includes at least one of: a frequency domain width and a location indication parameter of each subband, and a subcarrier spacing corresponding to each subband. The subband configuration information is used to indicate a subcarrier spacing corresponding to the second parameter set of each BP unit configured based on the terminal.

In a fourth manner: the base station broadcasts a second parameter set and subband configuration information of at least two BP units by using SIB information.

A second parameter set of a $k^{th}$ BP unit includes at least one of: a frequency domain width and a position indication parameter of the $k^{th}$ BP unit. When the $k^{th}$ BP unit includes a CORESET, the second parameter set of the $k^{th}$ BP unit further includes a frequency domain width and a position indication parameter of the CORESET corresponding to the $k^{th}$ BP unit. The subband configuration information includes at least one of: a frequency domain width and a position indication parameter of each subband, and a subcarrier spacing corresponding to each subband. The subband configuration information is used to indicate a subcarrier spacing corresponding to a second parameter set of each BP unit.

It should be understood that a difference between a configuration of a BP unit for the terminal and a configuration of a BP for the terminal lies in that the configuration of the BP unit for the terminal can reduce scheduling overheads on a network side. For example, if a mini-BP has a width of four PRBs, when BPs are allocated to a carrier including 100 PRBs by using a bitmap on a per mini-BP basis, only 25 bits are needed. If BPs are allocated by using a bitmap on a per PRB basis, 100 bits are needed. Therefore, scheduling overheads on a network side can be effectively reduced.

Further, as shown in FIG. 5, the identifier of the mini-BPs is indicated in the upper left corner of the figure, and timeslots corresponding to the mini-BPs are indicated in a lower left corner. As shown by an arrow a, a first BP unit set includes the mini-BP 1 whose numerology is 15 kHz. DCI transmitted in a timeslot 0 carries a BP unit adjustment instruction, instructing the UE to switch to a second BP unit set in a timeslot 1. The second BP unit set includes the mini-BP 1 and the mini-BP 2. To be specific, the second BP unit set instructs the UE to activate the mini-BP 1 and the mini-BP 2 in the timeslot 1. As shown by an arrow b, a first BP unit set includes the mini-BP 1 and the mini-BP 2. DCI transmitted by using the mini-BP 1 of 15 kHz in the timeslot 1 carries a BP unit adjustment instruction, instructing the UE to switch to a second BP unit set in the timeslot 0. The second BP unit set includes the mini-BP 3 and the mini-BP 4 of 30 kHz. To be specific, the mini-BP 3 and the mini-BP 4 of 30 kHz are activated. As shown by an arrow c, a first BP unit set includes the mini-BP 3 and the mini-BP 4. DCI transmitted by using the mini-BP 3 of 30 kHz in the timeslot 0 carries a BP unit adjustment instruction, instructing the UE to switch to a second BP unit set in the timeslot 1. The second BP unit set includes the mini-BP 3. To be specific, the mini-BP 3 of 30 kHz is activated. As shown by an arrow d, a first BP unit set includes the mini-BP 3. DCI transmitted by using the mini-BP 3 of 30 kHz in a timeslot 3 carries a BP unit adjustment instruction, instructing the UE to switch to a second BP unit set in the timeslot 0. The second BP unit set includes the mini-BP 1. To be specific, the mini-BP 1 of 15 kHz is activated.

Figure 6:
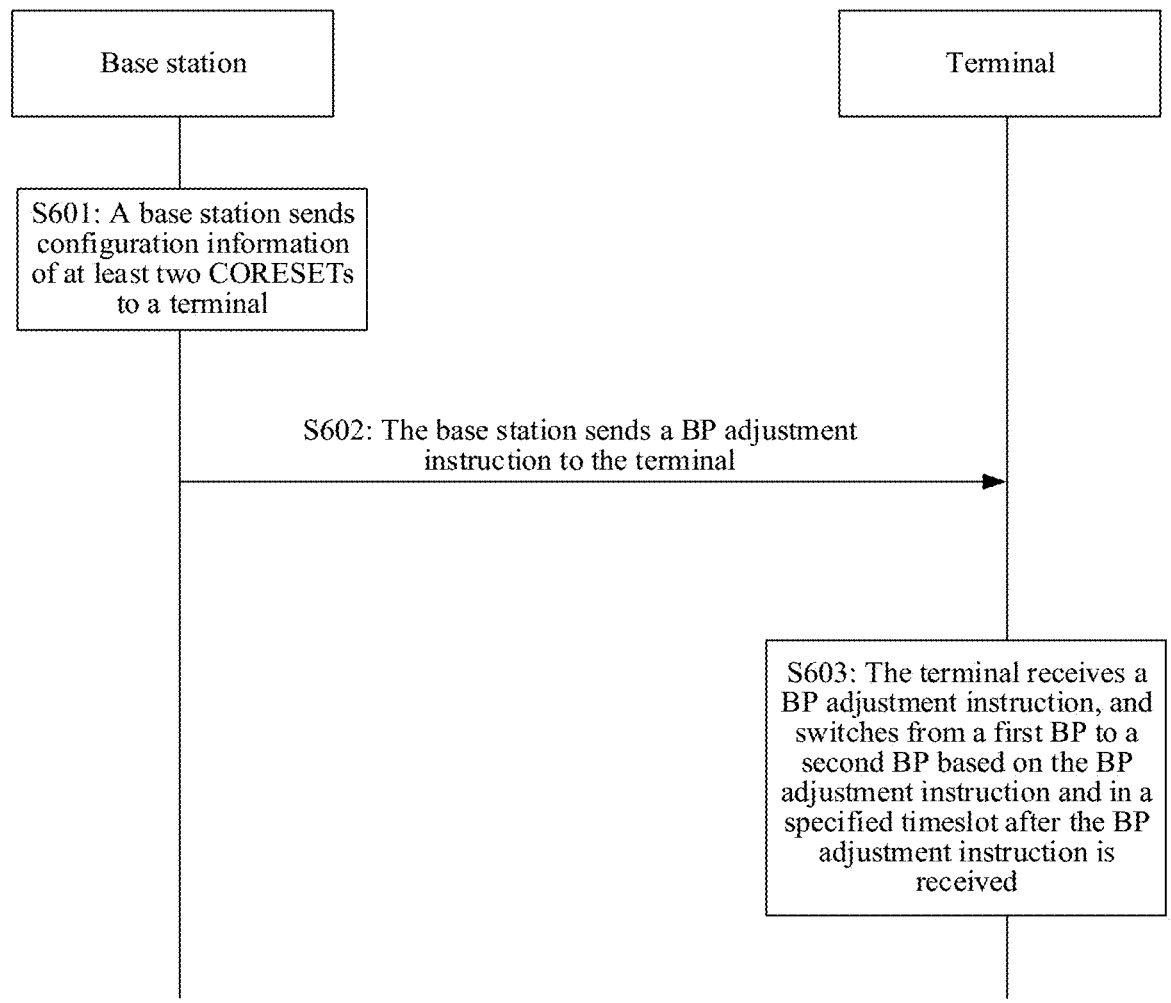
FIG. 6 is a third overview flowchart for adjusting a terminal operating bandwidth according to an embodiment of this application.

Referring to FIG. 6, an embodiment of this application provides a method for adjusting a terminal operating bandwidth, including the following steps.

Step 601: A base station sends configuration information of at least two CORESETs to a terminal.

Step 602: The base station sends a BP adjustment instruction to the terminal.

The BP adjustment instruction carries an identifier of a second CORESET, and a frequency domain width and a position indication parameter of a BP in which the second CORESET is located. The second CORESET is one of the at least two CORESETs. The BP adjustment instruction is used to instruct the terminal to switch from a first BP to a second BP in a specified timeslot after a BP unit adjustment instruction is received. The first BP is a currently working BP. The second BP is a BP indicated by the BP adjustment instruction.

Specifically, the base station may determine a BP adjustment instruction for each terminal based on a service requirement of the terminal and a current occupancy status of a carrier bandwidth.

In a possible implementation, the base station adds the BP adjustment instruction to DCI or a MAC CE, and sends the DCI or the MAC CE to the terminal.

Step 603: The terminal receives the BP adjustment instruction, and switches from a first BP to a second BP based on the BP adjustment instruction and in a specified timeslot after the BP adjustment instruction is received.

For step 601, the base station may configure the at least two CORESETs for the terminal by using, but not limited to, the following two manners.

In a first manner: the base station adds a first parameter set of the at least two CORESETs to RRC signaling.

A first parameter set of each CORESET includes at least one of: a frequency domain width and a position indication parameter of the CORESET, and a subcarrier spacing.

Figure 7:
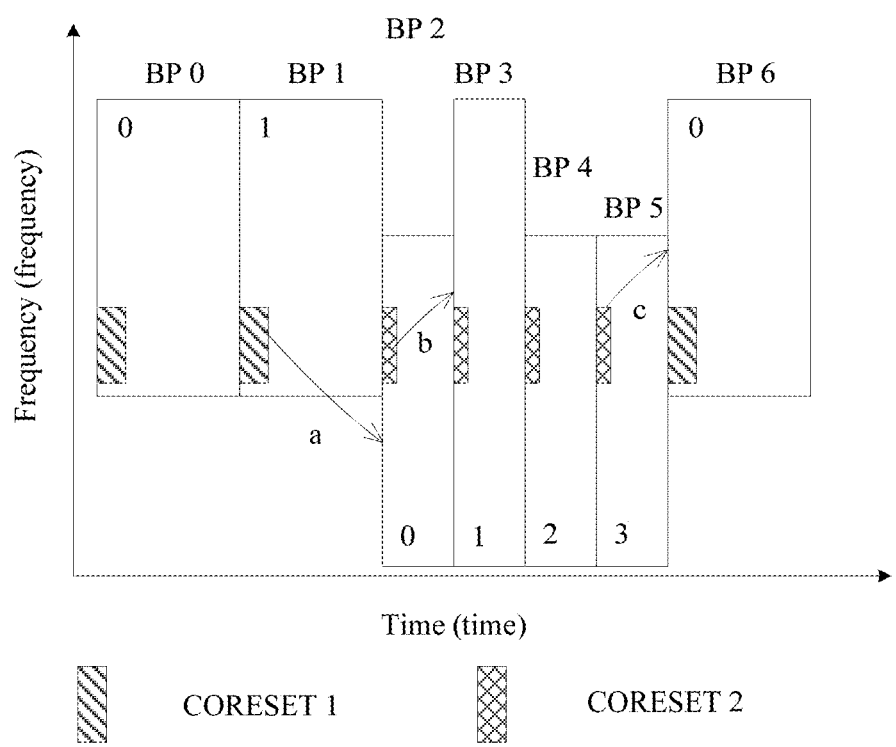
FIG. 7 is a schematic configuration diagram of a CORESET according to an embodiment of this application.

As shown in FIG. 7, the base station configures two CORESETs for the terminal. A frequency domain width and a position indication parameter of a CORESET 1 are the same as those of a CORESET 2. A numerology of the CORESET 1 is 15 kHz. A numerology of the CORESET 2 is 30 kHz.

In a second manner: the base station adds a second parameter set of the at least two CORESETs to RRC signaling, where a second parameter set of each CORESET includes at least one of: a frequency domain width and a position indication parameter of the CORESET.

The base station broadcasts subband configuration information by using SIB information. The subband configuration information includes at least one of: a frequency domain width and a location indication parameter of each subband, and a subcarrier spacing corresponding to each subband. The subband configuration information is used to indicate a subcarrier spacing corresponding to the second parameter set of each CORESET.

As shown in FIG. 7, the CORESET 1 whose numerology is 15 kHz instructs, by using DCI in a timeslot 1 of the CORESET 1, the UE to switch, in a next timeslot, from a BP 1 in which the CORESET 1 is located to a BP 2 in which the CORESET 2 is located, and indicates a frequency domain width and a position indication parameter of the BP 2, as shown by an arrow a. The CORESET 2 whose numerology is 30 kHz instructs, by using DCI in a timeslot 0 of the CORESET 2, the UE to switch, in a next timeslot, from the BP 2 in which the CORESET 2 is located to a BP 3 in which the CORESET 2 is located, and indicates a frequency domain width and a position indication parameter of the BP 3, as shown by an arrow b. The CORESET 2 whose numerology is 30 kHz instructs, by using DCI in a timeslot 3 of the CORESET 2, the UE to switch, in a next timeslot, from a BP 5 in which the CORESET 2 is located to a BP 6 in which the CORESET 1 is located, as shown by an arrow c.

Figure 8:
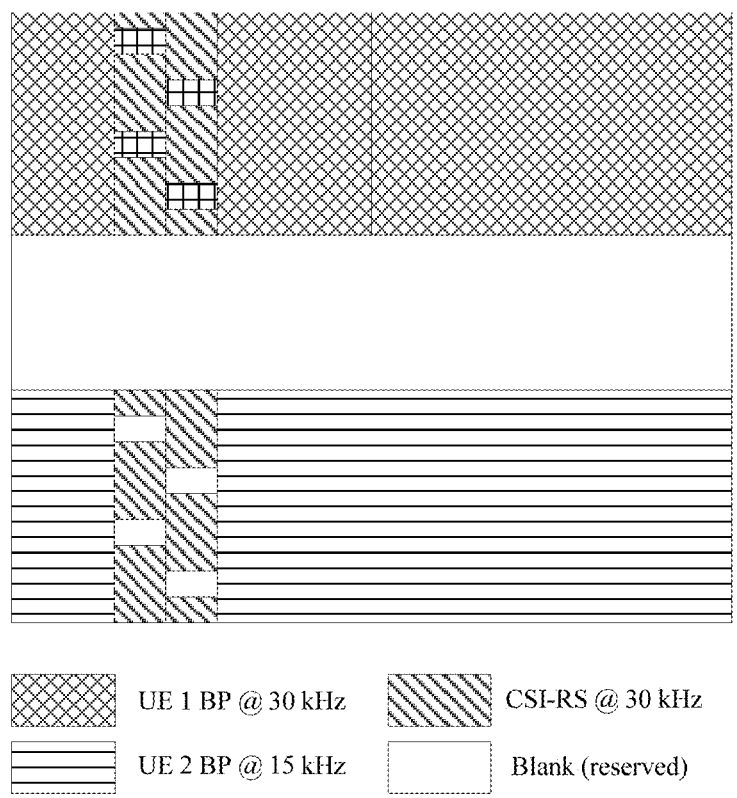
FIG. 8 is a schematic diagram of a resource mapping relationship between UE and a first reference signal when the UE uses only one subcarrier spacing to transmit and receive data according to an embodiment of this application.

Moreover, in an application scenario in which only one numerology can be used in a working BP of UE, as shown in FIG. 8, for a carrier, a first reference signal (for example, a CSI-RS, or an SRS) has only one subcarrier spacing. For example, a subcarrier spacing in a carrier is fixed at 30 kHz. A size of the subcarrier spacing is predefined in a protocol or configured by using a system broadcast message. In the carrier, a UE-specific BP may be configured by using RRC signaling, or a cell-specific BP may be configured by using a broadcast message such as SIB signaling. The BP may use different subcarrier spacings, or may use a same subcarrier spacing.

In this scenario, in a working BP of the UE, in a scheduling unit (for example, a timeslot, a mini-slot, a subframe, aggregated timeslots, aggregated mini-slots, or aggregated subframes), data may have a subcarrier spacing different from the subcarrier spacing of the first reference signal. As shown in FIG. 8, UE 1 is in a scheduling unit n, where n is a positive integer greater than or equal to zero. The subcarrier spacing of the data is 15 kHz. The subcarrier spacing of the first reference signal is 30 kHz. The data of the UE 1 can have only one subcarrier spacing. To be specific, the UE uses only one subcarrier spacing to transmit and receive data in one scheduling unit.

In the scenario, for a working BP of the UE, when data resource mapping is performed on a base station side or a terminal side, there may be different resource mapping manners based on a relationship between a subcarrier spacing of data in a subband and a subcarrier spacing of the first reference signal in the scheduling unit. When the subcarrier spacing of the data is the same as the subcarrier spacing of the first reference signal, the data of the UE may be mapped to a resource element that is not mapped in a symbol in which the first reference signal is located. For example, for the UE 1 shown in FIG. 8, the subcarrier spacing of the BP of the UE is the same as the subcarrier spacing of the first reference signal. Data may be mapped in an RE that is not used to transmit a reference signal in a symbol and that is occupied by the first reference signal. When the subcarrier spacing of the data is different from the subcarrier spacing of the first reference signal, the data of the UE, for example, UE 2 shown in FIG. 8, may not be mapped to a resource element that is not mapped in a symbol in which the first reference signal is located. The subcarrier spacing of the BP of the UE is different from the subcarrier spacing of the first reference signal. The data is not mapped in an RE that is not used to transmit a reference signal in the symbol and that is occupied by the first reference signal, but is reserved.

Figure 9:
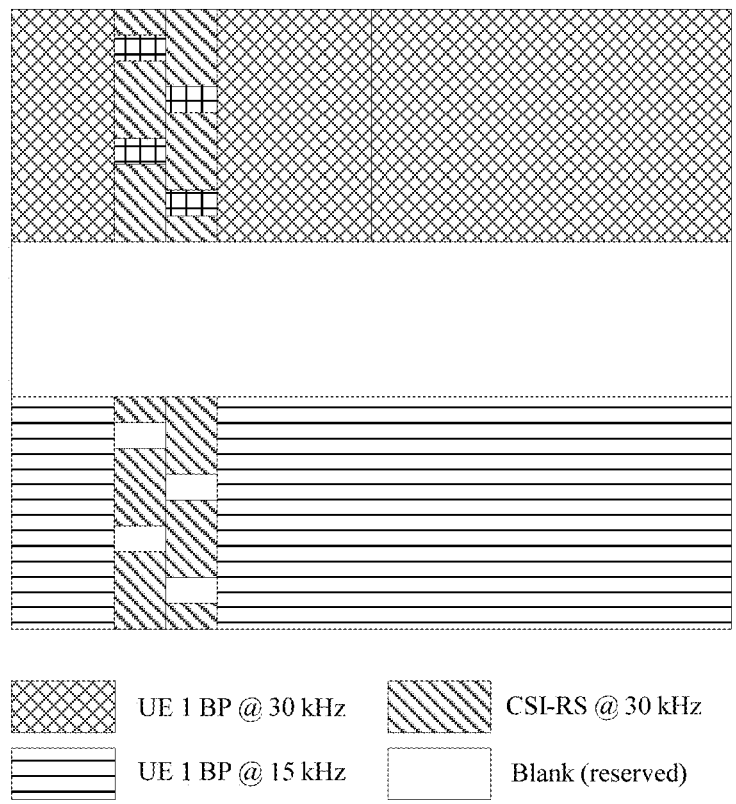
FIG. 9 is a schematic diagram of a resource mapping relationship between UE and a first reference signal when the UE uses a plurality of subcarrier spacings to transmit and receive data according to an embodiment of this application.

In an application scenario in which more than one numerology may be used in a working BP of UE, as shown in FIG. 9, in the scenario, for a carrier, a first reference signal (for example, a CSI-RS, or an SRS) has only one subcarrier spacing. For example, a subcarrier spacing in a carrier is fixed at 30 kHz. A size of the subcarrier spacing is predefined in a protocol or configured by using a system broadcast message. In the carrier, a UE-specific BP may be configured by using RRC signaling, or a cell-specific BP may be configured by using a broadcast message such as SIB signaling. Referring to the figure, the figure is a schematic diagram of division of subbands of 15 kHz and 30 kHz in a carrier. In the scenario, for UE, there may be m subcarrier spacings of data in a scheduling unit, where m is a positive integer greater than or equal to 1, for example, 1, 2, or 3. UE may receive or send data of m subcarrier spacings in a scheduling unit. As shown in the figure, in a scheduling unit n, the UE 1 receives or sends data of 15 kHz and data of 30 kHz, and receives or sends a first reference signal of 30 kHz. When data resource mapping is performed on a base station side or a terminal side, there may be different resource mapping manners based on a relationship between a subcarrier spacing of data and a subcarrier spacing of the first reference signal in the minimum resource allocation unit (for example, a PRB). When the subcarrier spacing of the data is the same as the subcarrier spacing of the first reference signal, the data of the UE may be mapped to a resource element that is not mapped in a symbol in which the first reference signal is located, as shown in an upper half of the UE 1 in FIG. 9. When the subcarrier spacing of the data is different from the subcarrier spacing of the first reference signal, the data of the UE cannot be mapped to the resource element that is not mapped in the symbol in which the first reference signal is located, as shown in a lower half of the UE 1 in the figure (an unused RE in a part, which is the same as the subcarrier spacing of the first reference signal, in the working BP of the UE may be used to map the data, and an unused RE in a part, which is different from the subcarrier spacing of the first reference signal, in the working BP of the UE is reserved and is not used to map the data).

Based on a same idea, this application further provides a communications apparatus. The communications apparatus may be configured to perform steps performed by a base station in FIG. 1. Therefore, for an implementation of the communications apparatus provided in an embodiment of this application, refer to an implementation of the method. Repeated content is not described again.

Figure 10:
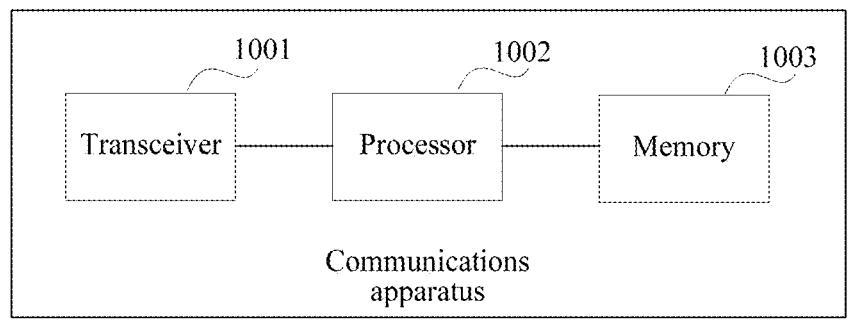
FIG. 10 is a first schematic structural diagram of a communications apparatus according to an embodiment of this application.

Referring to FIG. 10, an embodiment of this application provides a communications apparatus, including: a transceiver 1001, at least one processor 1002, and a memory 1003. The transceiver 1001, the processor 1002, and the memory 1003 are coupled by using a bus. The transceiver is responsible for communication between the communications apparatus and another communications apparatus. There is a program instruction in the memory 1003. The at least one processor 1002 executes the program instruction, to perform a step performed by a base station in the embodiment shown in FIG. 1.

Based on a same idea, this application further provides a communications apparatus. The communications apparatus may be configured to perform steps performed by a base station in FIG. 4. Therefore, for an implementation of the communications apparatus provided in an embodiment of this application, refer to an implementation of the method. Repeated content is not described again.

An embodiment of this application provides a communications apparatus. The communications apparatus has a same structure as the communications apparatus shown in FIG. 10, and includes: a transceiver, at least one processor, and a memory. The transceiver, the processor, and the memory are coupled by using a bus. The transceiver is responsible for communication between the communications apparatus and another communications apparatus. There is a program instruction in the memory. The at least one processor executes the program instruction, to perform a step performed by a base station in the embodiment shown in FIG. 4.

Based on a same idea, this application further provides a communications apparatus. The communications apparatus may be configured to perform steps performed by a base station in FIG. 6. Therefore, for an implementation of the communications apparatus provided in an embodiment of this application, refer to an implementation of the method. Repeated content is not described again.

An embodiment of this application provides a communications apparatus. The communications apparatus has a same structure as the communications apparatus shown in FIG. 10, and includes: a transceiver, at least one processor, and a memory. The transceiver, the processor, and the memory are coupled by using a bus. The transceiver is responsible for communication between the communications apparatus and another communications apparatus. There is a program instruction in the memory. The at least one processor executes the program instruction, to perform a step performed by a base station in the embodiment shown in FIG. 6.

Based on a same idea, this application further provides a communications apparatus. The communications apparatus may be configured to perform steps performed by a terminal in FIG. 1. Therefore, for an implementation of the communications apparatus provided in an embodiment of this application, refer to an implementation of the method. Repeated content is not described again.

Figure 11:
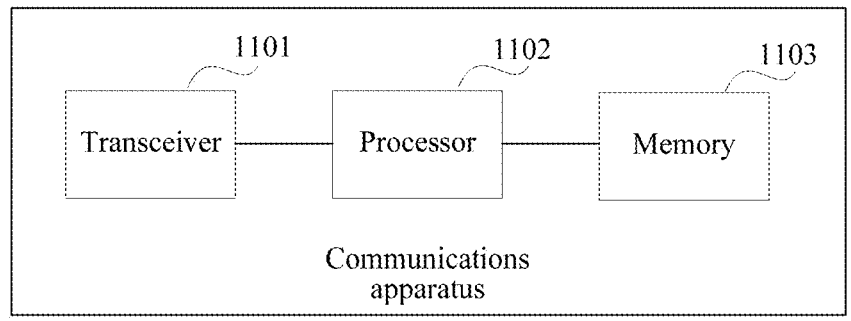
FIG. 11 is a second schematic structural diagram of a communications apparatus according to an embodiment of this application.

An embodiment of this application provides a communications apparatus. The communications apparatus has a same structure as the communications apparatus shown in FIG. 11, and includes: a transceiver 1101, at least one processor 1102, and a memory 1103. The transceiver 1101, the processor 1102, and the memory 1103 are coupled by using a bus. The transceiver 1101 is responsible for communication between the communications apparatus and another communications apparatus. There is a program instruction in the memory 1103. The at least one processor 1102 executes the program instruction, to perform a step performed by a terminal in the embodiment shown in FIG. 1.

Based on a same idea, this application further provides a communications apparatus. The communications apparatus may be configured to perform steps performed by a terminal in FIG. 4. Therefore, for an implementation of the communications apparatus provided in an embodiment of this application, refer to an implementation of the method. Repeated content is not described again.

An embodiment of this application provides a communications apparatus. The communications apparatus has a same structure as the communications apparatus shown in FIG. 11, and includes: a transceiver, at least one processor, and a memory. The transceiver, the processor, and the memory are coupled by using a bus. The transceiver is responsible for communication between the communications apparatus and another communications apparatus. There is a program instruction in the memory. The at least one processor executes the program instruction, to perform a step performed by a terminal in the embodiment shown in FIG. 4.

Based on a same idea, this application further provides a communications apparatus. The communications apparatus may be configured to perform steps performed by a terminal in FIG. 6. Therefore, for an implementation of the communications apparatus provided in an embodiment of this application, refer to an implementation of the method. Repeated content is not described again.

An embodiment of this application provides a communications apparatus. The communications apparatus has a same structure as the communications apparatus shown in FIG. 11, and includes: a transceiver, at least one processor, and a memory. The transceiver, the processor, and the memory are coupled by using a bus. The transceiver is responsible for communication between the communications apparatus and another communications apparatus. There is a program instruction in the memory. The at least one processor executes the program instruction, to perform a step performed by a terminal in the embodiment shown in FIG. 6.

This application further provides a computer readable storage medium. The computer readable storage medium stores an instruction. When the instruction runs on a computer, the computer is caused to perform the method according to FIG. 1, FIG. 4, and FIG. 6.

This application further provides a computer program product including an instruction. When the computer program runs on a computer, the computer is caused to perform the method according to FIG. 1, FIG. 4, and FIG. 6.

In conclusion, according to the method provided in the embodiments of this application, the base station sends the configuration information of the at least two BPs to the terminal, and sends the BP adjustment instruction to the terminal. The BP adjustment instruction carries the identifier of the second BP. The second BP is one of the at least two BPs. The BP adjustment instruction is used to instruct the terminal to switch from the first BP to the second BP in the specified timeslot after the BP unit adjustment instruction is received. The first BP is one of the at least two BPs. Therefore, the method provided in this application ensures flexible BP configuration, reduces network side overheads, and the terminal can use a more proper operating bandwidth.

The base station sends the configuration information of the at least two BP units to the terminal, and sends the BP unit adjustment instruction to the terminal. The BP unit adjustment instruction carries the identifier of the second BP unit set. The second BP unit set includes at least one of the at least two BP units. The BP adjustment instruction is used to instruct the terminal to switch from the first BP unit set to the second BP unit set in the specified timeslot after the BP unit adjustment instruction is received. The first BP unit set includes the at least one BP unit including the CORESET. The second BP unit set includes the at least one BP unit including the CORESET. The first BP unit set is the currently working BP unit set. Therefore, the method provided in this application ensures flexible BP configuration, reduces network side overheads, and the terminal can use a more proper operating bandwidth.

The base station sends the configuration information of the at least two control resource sets CORESETs to the terminal, and sends the BP adjustment instruction to the terminal. The BP adjustment instruction carries the identifier of the second CORESET, and the frequency domain width and the position indication parameter of the BP in which the second CORESET is located. The second CORESET is one of the at least two CORESETs. The BP adjustment instruction is used to instruct the terminal to switch from the first currently working BP to the second BP in the specified timeslot after the BP unit adjustment instruction is received. The first BP is the currently working BP. The second BP is the BP indicated by the BP adjustment instruction.

A person skilled in the art should understand that the embodiments of this application may be provided as a method, a system, or a computer program product. Therefore, the embodiments of this application may use a form of hardware only embodiments, software only embodiments, or embodiments with a combination of software and hardware. Moreover, the embodiments of this application may use a form of a computer program product that is implemented on one or more computer-usable storage media (including but not limited to a disk memory, a CD-ROM, an optical memory, and the like) that include computer-usable program code.

The embodiments of this application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to embodiments of this application without departing from the spirit and scope of this application. This application is intended to cover these modifications and variations provided that they fall within the scope of protection defined by the following claims and their equivalent technologies.

What is claimed is:

1. A method, comprising:
   sending, by a base station, configuration information of at least two bandwidth pails (BPs) to a terminal, the at least two BPs comprising a first BP and a second BP; and
   sending, by the base station, a BP adjustment instruction to the terminal,
   wherein the BP adjustment instruction carries an identifier of the second BP,
   wherein the BP adjustment instruction instructs the terminal to switch from the first BP to the second BP at a timeslot of the second BP, wherein which one timeslot in a plurality of timeslots of the second BP, at which the terminal switches, is determined based on a subcarrier spacing of the second BP, and
   wherein the first BP is a currently working BP of the terminal, and the second BP is a target BP.

2. The method according to claim 1, wherein the sending the configuration information comprises:
   sending, by the base station, Radio Resource Control (RRC) signaling to the terminal,
   wherein the RRC signaling carries a first parameter set of each BP of the at least two BPs configured based on the terminal, and
   wherein the first parameter set of the each BP configured based on the terminal comprises at least one of:
      a frequency domain width and a position indication parameter of the each BP,
      a frequency domain width and a position indication parameter of a control resource set (CORESET) corresponding to the each BP, or
      a subcarrier spacing of the each BP.

3. The method according to claim 1, wherein the sending the configuration information comprises:
   sending, by the base station, RRC signaling to the terminal,
   wherein the RRC signaling carries a second parameter set of each BP of the at least two BPs configured based on the terminal, and
   wherein the second parameter set of the each BP configured based on the terminal comprises at least one of:
      a frequency domain width and a position indication parameter of the each BP, or
      a frequency domain width and a position indication parameter of a control resource set (CORESET) corresponding to the each BP.

4. The method according to claim 3, wherein the sending the configuration information further comprises:
   broadcasting, by the base station, subband configuration information by using system information block (SIB) information,
   wherein the subband configuration information comprises at least one of:
      a frequency domain width and a position indication parameter of each subband, or
      a subcarrier spacing corresponding to the each subband, and
   wherein the subband configuration information indicates a subcarrier spacing corresponding to the second parameter set of the each BP configured based on the terminal.

5. The method according to claim 1, wherein the sending the BP adjustment instruction comprises:
   sending, by the base station, downlink control information (DCI) or a Media Access Control control element (MAC CE) to the terminal, wherein the DCI carries the BP adjustment instruction, or wherein the MAC CE carries the BP adjustment instruction.

6. The method of claim 1, wherein an k-th time slot in the plurality of timeslots of the second BP is determined as the timeslot, at which the terminal switches, based on the subcarrier spacing of the second BP, and wherein k is an integer between 1 and a number of time slots in the plurality of timeslots of the second BP.

7. The method of claim 1, wherein the subcarrier spacing of the second BP is smaller than a first subcarrier spacing of the first BP.

8. A method, comprising:
   receiving, by a terminal, configuration information of at least two bandwidth pails (BPs) from a base station, the at least two BPs comprising a first BP and a second BP;
   receiving, by the terminal, a BP adjustment instruction from the base station,
   wherein the BP adjustment instruction carries an identifier of the second BP,
   wherein the BP adjustment instruction instructs the terminal to switch from the first BP to the second BP in a timeslot of the second BP, wherein which one timeslot in a plurality of timeslots of the second BP, at which the terminal switches, is determined based on a subcarrier spacing of the second BP, and
   wherein the first BP is a currently working BP of the terminal, and the second BP is a target BP; and
   switching, by the terminal, from the first BP to the second BP in the timeslot of the second BP according to the BP adjustment instruction.

9. The method according to claim 8, wherein the receiving the configuration information comprises:
   receiving, by the terminal, Radio Resource Control (RRC) signaling from the base station,
   wherein the RRC signaling carries a first parameter set of each BP of the at least two BPs configured based on the terminal, and
   wherein the first parameter set of the each BP configured based on the terminal comprises at least one of:
      a frequency domain width and a position indication parameter of the each BP,
      a frequency domain width and a position indication parameter of a control resource set (CORESET) corresponding to the each BP, or
      a subcarrier spacing of the each BP.

10. The method according to claim 8, wherein the receiving the configuration information comprises:
    receiving, by the terminal, RRC signaling from the base station,
    wherein the RRC signaling carries a second parameter set of each BP of the at least two BPs configured based on the terminal, and
    wherein the second parameter set of the each BP configured based on the terminal comprises at least one of:
       a frequency domain width and a position indication parameter of the each BP, or a frequency domain width and a position indication parameter of a control resource set (CORESET) corresponding to the each BP.

11. The method according to claim 10, wherein the receiving the configuration information further comprises:
receiving, by the terminal, subband configuration information by using system information block (SIB) information from the base station,
wherein the subband configuration information comprises at least one of:
a frequency domain width and a position indication parameter of each subband, or
a subcarrier spacing corresponding to the each subband, and
wherein the subband configuration information indicates a subcarrier spacing corresponding to the second parameter set of the each BP configured based on the terminal.

12. The method according to claim 8, wherein the receiving the BP adjustment instruction comprises:
receiving, by the terminal, downlink control information (DCI) or a Media Access Control control element (MAC CE) from the base station, wherein the DCI carries the BP adjustment instruction, or wherein the MAC CE carries the BP adjustment instruction.

13. The method of claim 8, wherein an k-th time slot in the plurality of timeslots of the second BP is determined as the timeslot, at which the terminal switches, based on the subcarrier spacing of the second BP, and wherein k is an integer between 1 and a number of time slots in the plurality of timeslots of the second BP.

14. An apparatus, comprising:
at least one processor; and
a non-transitory memory storing instructions for execution by the at least one processor,
wherein, when executed by the at least one processor, the instructions cause the apparatus to perform operations comprising:
sending configuration information of at least two bandwidth pails (BPs) to a terminal, the at least two BPs comprising a first BP and a second BP; and
sending a BP adjustment instruction to the terminal,
wherein the BP adjustment instruction carries an identifier of the second BP,
wherein the BP adjustment instruction instructs the terminal to switch from the first BP to the second BP at a timeslot of the second BP, wherein which one timeslot in a plurality of timeslots of the second BP, at which the terminal switches, is determined based on a subcarrier spacing of the second BP, and
wherein the first BP is a currently working BP of the terminal, and the second BP is a target BP.

15. The apparatus according to claim 14, wherein the sending the configuration information comprises:
sending, Radio Resource Control (RRC) signaling to the terminal,
wherein the RRC signaling carries a first parameter set of each BP of the at least two BPs configured based on the terminal, and
wherein the first parameter set of the each BP configured based on the terminal comprises at least one of:
a frequency domain width and a position indication parameter of the each BP,
a frequency domain width and a position indication parameter of a control resource set (CORESET) corresponding to the each BP, or
a subcarrier spacing of the each BP.

16. The apparatus according to claim 14, wherein the sending the configuration information comprises:
sending RRC signaling to the terminal,
wherein the RRC signaling carries a second parameter set of each BP of the at least two BPs configured based on the terminal, and
wherein the second parameter set of the each BP configured based on the terminal comprises at least one of:
a frequency domain width and a position indication parameter of the each BP, or
a frequency domain width and a position indication parameter of a control resource set (CORESET) corresponding to the each BP.

17. The apparatus according to claim 16, wherein the sending the configuration information further comprises:
broadcasting subband configuration information by using system information block (SIB) information,
wherein the subband configuration information comprises at least one of:
a frequency domain width and a position indication parameter of each subband, or
a subcarrier spacing corresponding to each subband, and
wherein the subband configuration information indicates a subcarrier spacing corresponding to the second parameter set of the each BP configured based on the terminal.

18. The apparatus according to claim 14, the sending the BP adjustment instruction comprises:
sending downlink control information (DCI) or a Media Access Control control element (MAC CE) to the terminal, wherein the DCI carries the BP adjustment instruction, or wherein the MAC CE carries the BP adjustment instruction.

19. The apparatus of claim 14, wherein an k-th time slot in the plurality of timeslots of the second BP is determined as the timeslot, at which the terminal switches, based on the subcarrier spacing of the second BP, and wherein k is an integer between 1 and a number of time slots in the plurality of timeslots of the second BP.

20. An apparatus, comprising:
at least one processor; and
a non-transitory memory storing instructions for execution by the at least one processor,
wherein, when executed by the at least one processor, the instructions cause the apparatus to perform operations comprising:
receiving configuration information of at least two bandwidth pails (BPs) from a base station, the at least two BPs comprising a first BP and a second BP;
receiving a BP adjustment instruction from the base station,
wherein the BP adjustment instruction carries an identifier of the second BP,
wherein the BP adjustment instruction instructs the apparatus to switch from the first BP to the second BP in a timeslot of the second BP, wherein which one timeslot in a plurality of timeslots of the second BP, at which the apparatus switches, is determined based on a subcarrier spacing of the second BP, and
wherein the first BP is a currently working BP of the apparatus, and the second BP is a target BP; and
switching, from the first BP to the second BP in the timeslot of the second BP according to the BP adjustment instruction.

21. The apparatus according to claim 20, wherein the receiving the configuration information comprises:

receiving Radio Resource Control (RRC) signaling from the base station,
wherein the RRC signaling carries a first parameter set of each BP of the at least two BPs configured based on the apparatus,
wherein the first parameter set of the each BP configured based on the apparatus comprises at least one of:
a frequency domain width and a position indication parameter of the each BP,
a frequency domain width and a position indication parameter of a control resource set (CORESET) corresponding to the each BP, or
a subcarrier spacing of the each BP.

22. The apparatus according to claim 20, wherein the receiving the configuration information comprises:
receiving RRC signaling from the base station,
wherein the RRC signaling carries a second parameter set of each BP of the at least two BPs configured based on the apparatus, and
wherein the second parameter set of the each BP configured based on the apparatus comprises at least one of:
a frequency domain width and a position indication parameter of the each BP, or
a frequency domain width and a position indication parameter of a control resource set (CORESET) corresponding to the each BP.

23. The apparatus according to claim 22, wherein the receiving the configuration information further comprises:
receiving subband configuration information by using system information block (SIB) information from the base station,
wherein the subband configuration information comprises at least one of:
a frequency domain width and a position indication parameter of each subband, or
a subcarrier spacing corresponding to the each subband, and
wherein the subband configuration information indicates a subcarrier spacing corresponding to the second parameter set of the each BP configured based on the apparatus.

24. The apparatus according to claim 20, wherein the receiving the BP adjustment instruction comprises:
receiving, downlink control information (DCI) or a Media Access Control control element (MAC CE) from the base station, wherein the DCI carries the BP adjustment instruction, or wherein the MAC CE carries the BP adjustment instruction.

25. The apparatus of claim 20, wherein an k-th time slot in the plurality of timeslots of the second BP is determined as the timeslot, at which the apparatus switches, based on the subcarrier spacing of the second BP, and wherein k is an integer between 1 and a number of time slots in the plurality of timeslots of the second BP.

* * * * *

UNITED STATES PATENT AND TRADEMARK OFFICE
CERTIFICATE OF CORRECTION

PATENT NO. : 11,330,477 B2
APPLICATION NO. : 16/673161
DATED : May 10, 2022
INVENTOR(S) : Zhe Liu et al.

It is certified that error appears in the above-identified patent and that said Letters Patent is hereby corrected as shown below:

In the Claims

Claim 1, Column 27, Line 12; delete "pails" and insert --parts--.

Claim 8, Column 28, Line 24; delete "pails" and insert --parts--.

Claim 14, Column 29, Line 40; delete "pails" and insert --parts--.

Claim 20, Column 30, Line 49; delete "pails" and insert --parts--.

Signed and Sealed this
Nineteenth Day of July, 2022

Katherine Kelly Vidal
*Director of the United States Patent and Trademark Office*